United States Patent

Mueller

[15] 3,664,248

[45] May 23, 1972

[54] OPTICAL PROCESSING OF INFORMATION INCLUDING SYNTHESIS BY COMPLEX AMPLITUDE ADDITION OF DIFFRACTION SPECTRA

[72] Inventor: Peter F. Mueller, Concord, Mass.

[73] Assignee: Technical Operations Incorporated, Burlington, Mass.

[22] Filed: May 3, 1968

[21] Appl. No.: 726,455

Related U.S. Application Data

[63] Continuation-in-part of Ser. No. 564,340, July 11, 1966.

[52] U.S. Cl. ..............................95/12.2, 178/5.2 R, 355/40

[51] Int. Cl. ..............................G03b 33/00

[58] Field of Search ..................95/12.2; 355/33, 34, 77, 32, 355/40; 178/5.4, 5.2; 350/16.25 F

[56] References Cited

UNITED STATES PATENTS

| | | | |
|---|---|---|---|
| 2,673,923 | 3/1954 | Williams | 240/3.1 |
| 3,151,520 | 10/1964 | Nadeau | 355/40 |
| 3,324,764 | 6/1967 | Altman | 355/4 |
| R20,748 | 6/1938 | Bocca | 355/77 |
| 2,189,751 | 2/1940 | Bocca et al. | 96/2 |
| 3,408,143 | 10/1968 | Mueller | 355/40 |
| 3,378,633 | 4/1968 | Macovski | 178/5.4 |
| 3,419,672 | 12/1968 | Macovski | 178/5.4 |
| 3,470,310 | 9/1969 | Shashoua | 178/5.2 |

*Primary Examiner*—Samuel S. Matthews
*Assistant Examiner*—Robert P. Greiner
*Attorney*—Alfred H. Rosen and John H. Coult

[57] ABSTRACT

This disclosure depicts a number of ways for implementing a novel optical information processing technique utilizing a phenomena (herein termed Fourier optical synthesis) involving effecting a complex amplitude addition of diffraction spectra characterizing two or more object functions. The processed object functions may represent totally different scenes, or color separation functions of a common colored scene. Embodiments are shown in which a plurality of object functions are recorded in an interlace geometry on a common recording medium to form a composite optical record suitable for processing using Fourier optical synthesis techniques as described in detail herein. The disclosure teaches effecting a complex amplitude addition of diffraction spectra representing object functions recorded on discrete recording media in which the processed object functions are optically interlaced in space in a coherent detection system. Techniques of spectral zonal photography are described wherein color information is encoded with unique carrier functions and wherein the zeroth order channel in a coherent optical detection system as well as a diffracted order channel or channels are utilized for the transmission of color information. Various other records and recording techniques and detection systems useful in the practice of the invention are also disclosed.

16 Claims, 37 Drawing Figures

PETER F. MUELLER
INVENTOR

BY: ALFRED H. ROSEN
and
JOHN H. COULT
ATTORNEYS

PETER F. MUELLER
INVENTOR

BY: ALFRED H. ROSEN
and
JOHN H. COULT
ATTORNEYS

*PETER F. MUELLER*
INVENTOR

BY *ALFRED H. ROSEN*
and
*JOHN H. COULT*
ATTORNEYS

PETER F. MUELLER
INVENTOR

BY: ALFRED H. ROSEN
and
JOHN H. COULT
ATTORNEYS

PETER F. MUELLER
INVENTOR

BY: ALFRED H. ROSEN
and
JOHN H. COULT
ATTORNEYS

Patented May 23, 1972

3,664,248

12 Sheets-Sheet 6

PETER F. MUELLER
INVENTOR

BY: ALFRED H. ROSEN
and
JOHN H. COULT
ATTORNEYS

PETER F. MUELLER
INVENTOR

BY: ALFRED H. ROSEN
and
JOHN H. COULT
ATTORNEYS

PETER F. MUELLER
INVENTOR

BY: ALFRED H. ROSEN
and
JOHN H. COULT
ATTORNEYS

PETER F. MUELLER
INVENTOR

BY: ALFRED H. ROSEN
and
JOHN H. COULT
ATTORNEYS

PETER F. MUELLER
INVENTOR

BY: ALFRED H. ROSEN
and
JOHN H. COULT
ATTORNEYS

PETER F. MUELLER
INVENTOR

BY: ALFRED H. ROSEN
and
JOHN H. COULT
ATTORNEYS $S(\underline{\mu}, \lambda)\left[\tilde{\pi}(\underline{\mu}) * \tilde{I}(\underline{\mu})\right]$

*PETER F. MUELLER*
INVENTOR

BY: *ALFRED H. ROSEN*
and
*JOHN H. COULT*
ATTORNEYS

OPTICAL PROCESSING OF INFORMATION INCLUDING SYNTHESIS BY COMPLEX AMPLITUDE ADDITION OF DIFFRACTION SPECTRA

CROSS-REFERENCE TO RELATED APPLICATION

This application is a continuation-in-part of application Ser. No. 564,340, filed July 11, 1966.

BACKGROUND OF THE INVENTION

This invention concerns a technique for optically processing information which exploits the phenomena (herein termed Fourier optical synthesis) that the spatial frequency spectra characterizing a plurality of optically additive object functions which are respectively multiplied with harmonically related carrier functions are caused to add in complex amplitude in a Fourier (frequency) space established in a coherent optical detection system. The optical addition or subtraction of two or more record functions has been achieved using holographic recording and retrieval techniques. Such is described in an article entitled "Optical Image Synthesis (Complex Amplitude Addition and Subtraction) by Holographic Fourier Transformation" by Dennis Gabor, et al., in PHYSICS LETTERS, Vol. 18, No. 2 Aug. 15, 1965), pp. 116–118. The holographic methods, however, operating under an entirely different principle, have certain severe limitations. The recording operation must, in a practical system, be carried out in laser radiation because of the great spatial and temporal coherence required. The necessity of using a laser in the recording process restricts the holographic process to the laboratory and to inanimate photographic subjects. By the nature of the holographic process, in which scene information is stored as a linear superposition of interference fringes, the photographed objects must be effectively stationary—thus, another restriction to laboratory practice.

Briefly, the holographic technique involves first exposing a photosensitive recording medium to a reference beam and a mutually coherent beam from one of the object functions to be synthesized. Subsequently the same recording medium is exposed to a second object function and a reference beam phase-shifted by $\pi$ radians with respect to the first reference beam. A composite record is thus formed comprising an additive pair of holograms having respective fringes phase-displaced by one-half period.

Playback of this composite hologram with coherent radiation produces a Dirac delta function array about which is convolved a reconstructed image representing the complex amplitude difference of the transmittance functions of the two record functions. It is evident that the achievement of optical synthesis of images by the described holographic method is attributable to the phase preserving properties of a hologram. In addition to the above-mentioned limitations of the holographic synthesis technique, the phase plates required for relatively shifting the phase of one of the reference beams are difficult and expensive to fabricate, and the retrieved images are apt to have lower resolution than with my method due to the embryonic state of the holographic art. As will become evident from the following description, my invention is quite unlike the described holographic technique and is subject to none of the above-mentioned limitations.

OBJECTS OF THE INVENTION

It is a primary object of this invention to provide novel optical information processing methods and means capable of achieving optical synthesis of distinct object functions without prior art limitations. It is an object that the object functions to be synthesized may be recorded in incoherent light under normal photographic conditions.

It is another object to provide methods and means of optical information processing which minimize registration errors during retrieval and relax the quality requirements on the retrieval optics.

It is yet another object to provide improved methods and means of spectral zonal photography.

Other objects and advantages of the invention will in part be obvious and will in part become apparent as the following description proceeds.

The features of novelty which characterize the invention will be pointed out with particularity in the claims annexed to and forming a part of this specification.

BRIEF DESCRIPTION OF THE DRAWINGS

For a fuller understanding of the invention reference may be had to the following detailed description taken in connection with the accompanying drawings wherein.

DESCRIPTION OF THE PREFERRED EMBODIMENTS

The conceptual foundation of this invention involves additively combining a plurality of record functions respectively multiplied with harmonically related carrier functions, and, using Fourier transformation and spatial filtering techniques in a coherent optical retrieval system, detecting selected functions representing complex amplitude additive (including subtractive) combinations of the spatial frequency spectra characterizing said record functions. The complex addition of the record function spectra is accomplished by effecting an optical interlacing of the record functions, either during the recording process (e.g., by effecting formation of a composite record having the plurality of functions interlaced thereon), or alternatively, in a direct retrieval step (e.g., by effectively interlacing in space the separate carrier modulating record functions). As will become evident from the following description, an important aspect of my novel information processing technique lies in the establishment of a predetermined spatial phase relationship between the optically multiplexed record functions in order to achieve complex amplitude subtraction of the diffraction spectra produced by the respective record functions. In the interest of simplifying the ensuing description without intending a limitation on the scope of the underlying principles, this phenomena of complex amplitude addition of the diffraction spectra of different record functions is hereinafter termed Fourier optical synthesis.

Figure 1:
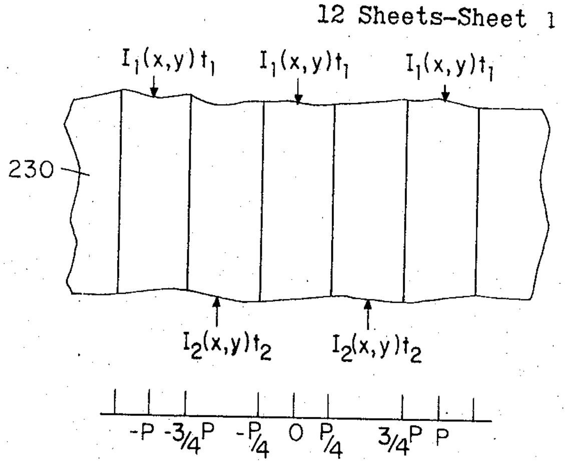
FIG. 1 is a schematic illustration, grossly distorted for clarity, of a composite record comprising interlaced record functions useful in the practice of this invention.

In order to further the understanding of the phenomena of Fourier optical synthesis, a mathematical analysis will be undertaken. The principle is general and may be treated two-dimensionally. However, in the interest of simplicity, the immediate analysis will be undertaken in one dimension only. Again, although the underlying mathematical and physical concepts are completely general, the immediate description will be in terms of a recording process involving the formation of a composite optical record comprising two interlaced record functions. FIG. 1 depicts such a composite record 230. The record may be formed as follows. A first record function representing an image intensity distribution $I_1(x,y)$ is multiplied by a one-dimensional periodic carrier function $P(x)$ described as:

$$P(x) = \begin{cases} 1, & x < p/4 \\ 0 & p/4 < x < 3/4\,p \\ 1 & 3/4\,p < x < p \end{cases}$$

and $$P(x \pm np) = P(x) \quad (1)$$

with $$n = 0, 1,2,3$$

A photographic emulsion is exposed to the resulting product for time $t_1$. A second record function representing an image intensity distribution $I_2(x,y)$ is then multiplied by a periodic carrier function $P'(x)$ ($P'(x)$ representing $P(x + p/2)$) and this product is added to the product of $I_1(x,y)$ and $P(x)$ by exposing the same emulsion to $I_2(x,y)\,P'(x)$ for a time interval $t_2$, the composite record 230 thus formed comprising an interlace of $I_1(x,y)$ and $I_2(x,y)$ with a half-period relative spatial phase displacement.

The amplitude transmittance of the record 230, after processing, can be described as follows:

$$T_A(x, y) = K_1 I_1(x, y)^{-\gamma/2} P(x) + K_2 I_2(x, y)^{-\gamma/2} P'(x) \quad (2)$$

where $$K_1 = t_1^{-\gamma/2} / E_b^{-\gamma/2}$$

$E_b$ is the abcissa intercept and $\gamma$ is the slope of the processing density-log exposure curve.

The Fourier transform of Eq. (2) is $$\tilde{T}_A(\mu_x, \mu_y) = \int_{-\infty}^{\infty}\int_{-\infty}^{\infty} (K_1 I_1(x, y)^{-\gamma/2} P(x) + K_2 I_2(x, y)^{-\gamma/2} P'(x)) e^{2\pi i(\mu_x x + \mu_y y)} dx dy \quad (3)$$

If we let $$F_1(\mu_x, \mu_y) = \int\int K_1 I_1(x, y)^{-\gamma/2} e^{2\pi i(\mu_x x + \mu_y y)} dx dy \quad (4)$$

and $$F_2(\mu_x, \mu_y) = \int\int K_2 I_2(x, y)^{-\gamma/2} e^{2\pi i(\mu_x x + \mu_y y)} dx dy \quad (5)$$

then by the convolution theorem $$\tilde{T}_A(\mu_x, \mu_y) = \int_{-\infty}^{\infty} F_1(\mu_x - \sigma, \mu_y) \tilde{P}(\sigma) d\sigma + \int_{-\infty}^{\infty} F_2(\mu_x - \sigma, \mu_y) \tilde{P}'(\sigma) d\sigma \quad (6)$$

where $\sigma$ is a dummy variable of integration.

But $$\tilde{P}(\sigma) = \sum_{n=-\infty}^{\infty} \int_{np-p/4}^{np+p/4} (1) e^{2\pi i\sigma x} dx \quad (7)$$

$$= 1/2 \text{ sinc } 2\pi p/4\sigma \sum_{n=\infty}^{\infty} \delta(\sigma - n/p) \quad (8)$$

Similarly, $$\tilde{P}'(\sigma) = \sum_{n=-\infty}^{\infty} \int_{np+p/4}^{np+3/4p} e^{2\pi i\sigma x} dx \quad (9)$$

$$\tilde{P}'(\sigma) = e^{2\pi ip/2\sigma} 1/2 \text{ sinc } 2\pi p/4\sigma \sum_{-\infty}^{\infty} \delta(\sigma - n/p) \quad (10)$$

$$\tilde{P}'(\sigma) = e^{2\pi ip/2\sigma}\, \tilde{P}(\sigma) \quad (11)$$

Substituting Eq. (8) and (10) into Eq. (6) yields $$\tilde{T}_A(\mu_x, \mu_y) = \int_{-\infty}^{\infty} F_1(\mu_x - \sigma, \mu_y) 1/2 \text{ sinc } 2\pi p/4\sigma \sum_{n=\infty}^{\infty} \delta(\sigma - n/p) d\sigma + \int_{\infty}^{\infty} F_2(\mu_x - \sigma, \mu_y) e^{2\pi ip/2\sigma} 1/2 \text{ sinc } 2\pi p/4\sigma \sum_{n=\infty}^{\infty} \delta(\sigma - n/p) d\sigma \quad (12)$$

Translated into physical terms, equation (12) states that a Fourier transformation of the complex amplitude transmittance of the record 230, processed to a photographic transparency comprises a convolution of the spatial frequency spectrum of $I_1(x,y)$ with a Dirac delta function array of infinite components produced by carrier function $P(x)$ summed with a convolution of the spatial frequency spectrum of $I_2(x,y)$ with a Dirac delta function array produced by carrier function $P'(x)$. It is important to note, for reasons which will become more apparent below, that the spatial displacement between carrier functions $P(x)$ and $P'(x)$ has been transformed by operation of the Fourier integral into a linear phase factor $$e^{2\pi ip/2\sigma}$$

appearing in the second term of equation (12).

Considering only the spectra convolved about the delta functions associated with the (common) fundamental frequency ($\sigma=1/p$) of carrier functions P(x) and P′ (x), i.e., the harmonic order $n=1$ (assuming in the interest of simplicity, $I_1$, and $I_2$ to be frequency limited to 1/2$p$), $$\tilde{T}_A(\mu_x, \mu_y)|_{n=\pm1}=F_1(\mu_x-1/p, \mu_y)1/2 \text{ sinc } \pi/2 + F_2(\mu_x-1/p, \mu_y)1/2e^{\pi i} \text{ sinc } \pi/2 \quad (13)$$

$$=1/\pi[F_1(\mu_x-1/p, \mu_y)-F_2(\mu_x-1/p, \mu_y)]. \quad (14)$$

Thus, equation 14 reveals that a complex amplitude spectral difference function is generated in the Fourier domain.

Retransformation of equation 14 by the inversion theorem in cartesian coordinates $u,v$ given $$T_A(u, v)=1/\pi e^{2\pi iu/p}[K_1I_1(u, v)^{-\gamma/2}-K_2I_2(u, v)^{-\gamma/2}]. \quad (15)$$

Thus, the complex amplitude distribution of the operational transform of the spectral difference function defined by equation 14 represents a difference between the images of $I_1(x,y)$ and $I_2(x,y)$ formed independently. When $\gamma=-2$ (I have not found this to be a strict constraint) and $t_1 = t_2$, there is generated the complex amplitude difference function $$T_A(u, v)=1/\pi ke^{2\pi iu/p}|I_1(u, v)-I_2(u, v)|$$

$$=1/\pi ke^{2\pi iu/p}\Delta I(u, v) \quad (16)$$

which may be recorded by conventional square law detectors as the intensity distribution $$I_{Diff}(u,v)=(k/\pi)^2(\Delta I(u,v))^2 \quad (17)$$

The simplified one-dimensional mathematical description above is sufficient to illustrate certain basic concepts underlying my invention. These are that at some stage of the information processing, the record functions desired to be synthesized are respectively multiplied with a substantially periodic carrier function and then caused, as by interlacing, to be optically additive. The retrieval operation is accomplished, as will be described in more detail hereinafter, in a coherent optical system within which is established a so-called Fourier transform space containing a convolution of a spatial frequency spectrum associated with each of the records with a Dirac delta function array. By the selection of carrier functions having one or more like harmonic components and by effectively aligning the carrier functions (inherently achieved in an interlace geometry) a spectral order associated with each of the record functions is caused to coincide in transform space at least once. By establishing a predetermined displacement between the spatial phase of the carrier functions impressed on the record functions, there is caused a complex amplitude subtraction of the spectra of the first and second record functions. Retransformation of the difference function thus formed produces a two-dimensional display which represents the optical difference between the first and second record functions.

In a simple but dramatic application, my invention may be used to effect an optical subtraction of two totally different record functions.

Figure 1A:
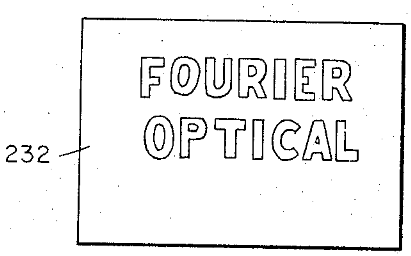
FIGS. 1A and 1B show hypothetical objects useful in an illustration of the principles and practice of the invention.
Figure 1B:
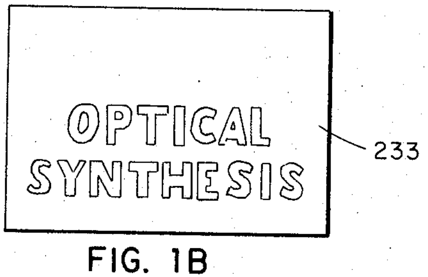

Assume the functions to be synthesized comprise the words "FOURIER OPTICAL" as shown on record 232 in FIG. 1A, and the words "OPTICAL SYNTHESIS" as shown on record 233 in FIG. 1B.

Figures 1C, 1D:
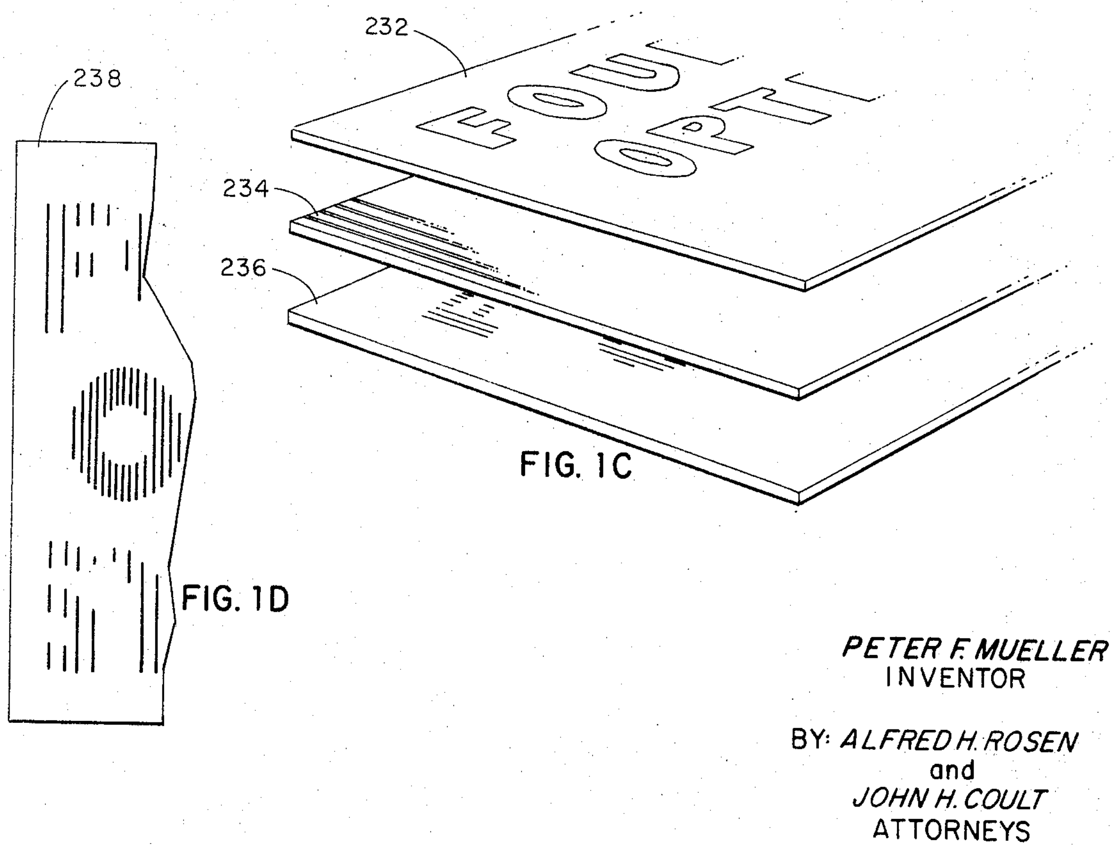
FIG. 1C is a schematic exploded view of one step of a two-step contact printing process which may be employed in the fabrication of a composite optical record useful in the practice of my invention.
FIG. 1D is a composite record comprising interlaced images of the objects shown in FIGS. 1A and 1B which might be formed by the process illustrated in part in FIG. 1C.

To prepare a composite optical record as described mathematically above, conventional photographic contact printing techniques may be used, although other methods are suitable. FIG. 1C is a schematic exploded view of the contact printing method being applied, illustrating a portion of the record function 232 being contact printed through a grating mask 234 to form an image on a photosensitive material 236 which represents a multiplication of the record 232 with the mask 234. The second record 233 is interlaced with the first record 232 by replacing the record 232 with record 233, shifting the grating mask 234 a distance equal to one-half the period "$p$" of the grating and exposing the photosensitive material 236 a second time. The composite record 238 thus formed would appear as shown in part in FIG. 1D, the composite record function comprising the modulated words "FOURIER OPTICAL" being interlaced with the second record function comprising the words "OPTICAL SYNTHESIS." Thus, the composite record 238 represents an additive combination of two record functions respectively multiplied with spatial carriers having a half-period spatial phase displacement.

Figure 1E:
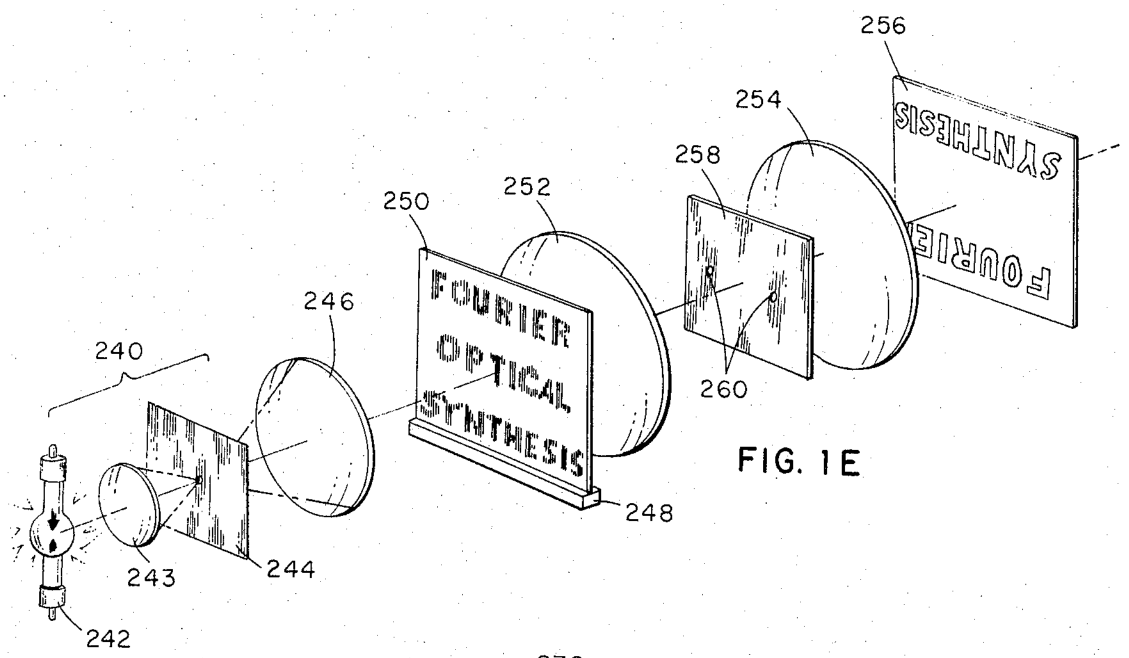
FIG. 1E illustrates, schematically and in exaggerated scale, a coherent optical detection system for performing Fourier optical synthesis in accordance with the invention.

Various techniques may be employed for retrieving from the composite record 238 a function representing the difference in complex amplitude transmittance hereinafter termed, in the interest of convenience, the optical difference between the records 232 and 233. FIG. 1E schematically shows a system for effecting retrieval of the described optical difference function. The FIG. 1E system is illustrated as including light source means 240, comprising an arc lamp 242, lens 243, and apertured mask 244, for generating an effective point source of high intensity luminous energy, a collimating lens 246, and a film gate 248 for supporting an optical record 250. A transform lens 252 cooperating with the collimating lens 246 forms an image of the effective point source at a plane termed the Fourier transform plane at which appears a Fraunhofer diffraction pattern of the record 250. A projection lens 254 together with the transform lens 252 images the record 250 upon a display screen 256. The effective point source created by the light source means 244 and the collimating lens 246 produces optical wavefronts having sufficient spatial coherence to produce a diffraction pattern at the described Fourier transform plane which substantially represents a Fourier transformation of the complex amplitude distribution across the record 250. In general, the diffraction pattern of the record 250 represents a convolution of a spatial frequency spectrum characterizing the record distribution with a Dirac delta function array produced by carriers on the record 250. In the illustrated example, the record functions are multiplied with azimuthally aligned carriers of like periodicity, and thus the Dirac delta function array produced by each of the record functions is coincident in the Fourier transform space. However, by this invention, the spatial carriers respectively modulated by the record functions have a spatial phase displacement equal to one-half the fundamental carrier period $p$. Thus, the complex amplitude distributions produced by the two record functions will destructively interfere in the Fourier transform space to produce a difference function representing a complex amplitude subtraction of one record function from the other. This difference function may be selectively transmitted through the Fourier transform space by placing a spatial filter mask 258 in the Fourier transform space which has a pair of diametrically located apertures 260 therein for transmitting the fundamental ($n$=1) diffraction orders produced by the record 250. Thus, the display produced on the screen 256, comprising the words "FOURIER SYNTHESIS" represents the optical difference between the record functions "FOURIER OPTICAL" and "OPTICAL SYNTHESIS."

It is important to note that by my invention the complex amplitude addition (including, of course, subtraction) can be accomplished by forming the record functions to be synthesized in *incoherent* light and thus without the attendance of the numerous limitations imposed by having to perform the recording step in coherent light as is required with the holographic image synthesis technique described above. It is also evident that the mode of operation of my invention is substantially different from that of the holographic technique in that, inter alia, the complex amplitude addition occurs in Fourier transform space, rather than at the eventual output plane.

The illustrated photostorage and retrieval method and system is not to be interpreted as being limiting in any sense. Numerous other techniques are contemplated by this invention for achieving synthesis of optical functions in accordance with the above-described principles. For example, there is no limitation on the practice of this invention to the synthesis of binary images-as noted from the mathematical analysis, the nature of the record functions which may be synthesized is unrestricted. Continuous tone amplitude or phase images may be synthesized by my technique. The geometry of the carriers with which the record functions to be synthesized are multiplied is again substantially without limitation. For example, (as related to the described contact printing method) the transparent slits may be made much narrower than the opaque bars. Although a record thus formed would be inefficient in its utilization of the film area, the operation of the principles of the invention are not affected and complex amplitude addition would take place as described.

Alternatively, the transparent areas of the grating mask may in fact be greater than one-half the grating period. The result of the use of such a grating geometry is that the interlaced record functions will overlap along the elemental strip image margins. However, if the optically additive relationship between the two record functions is maintained, the operation of the principles of the invention are not violated. In order to preserve this additive relationship, the composite record preferably is linearly processed to a gamma of minus two in order that the complex amplitude transmission of the record is substantially linearly related to the intensity of the recording illumination. This restraint is not restrictive; it has been found that considerable latitude in processing may be tolerated without significantly affecting the equality of the recovered images.

It is noted that optical subtraction may be achieved, as described, independent of the polarity of the processed composite record since it is a difference function, not an absolute function, which is sought.

An arrangement has been shown for practicing the invention involving forming a composite record by sequential contact printing of record functions through a shifted grating mask. Another way by which the record functions to be synthesized may be interlaced on a common record is by the use of the incoherent optical system shown in FIG. 1F. Records 262 and 264 containing the record functions are located in separate legs of an incoherent projection system and respectively multiplied with spatial carrier functions in the form of amplitude gratings 266, 268, of like period, the respective products being imaged by a lens 269 in overlapping relationship at a common image plane containing a photosensitive material 270. The optical superposition of the images of the record function 262 and 264 may be accomplished in many ways; the FIG. 1F system utilizes a pair of semi-reflective mirrors 272 and 274 and a pair of totally reflective mirrors 276 and 278 to bring the records into effective optical registration. The carriers multiplied with the records 262, 264 are azimuthally aligned and the spatial phase of the carriers adjusted to be effectively displaced by one-half of a grating period. The composite image recorded on the photosensitive material 270 thus represents an interlace of the functions on records 262 and 264.

Figures 1F, 1G:
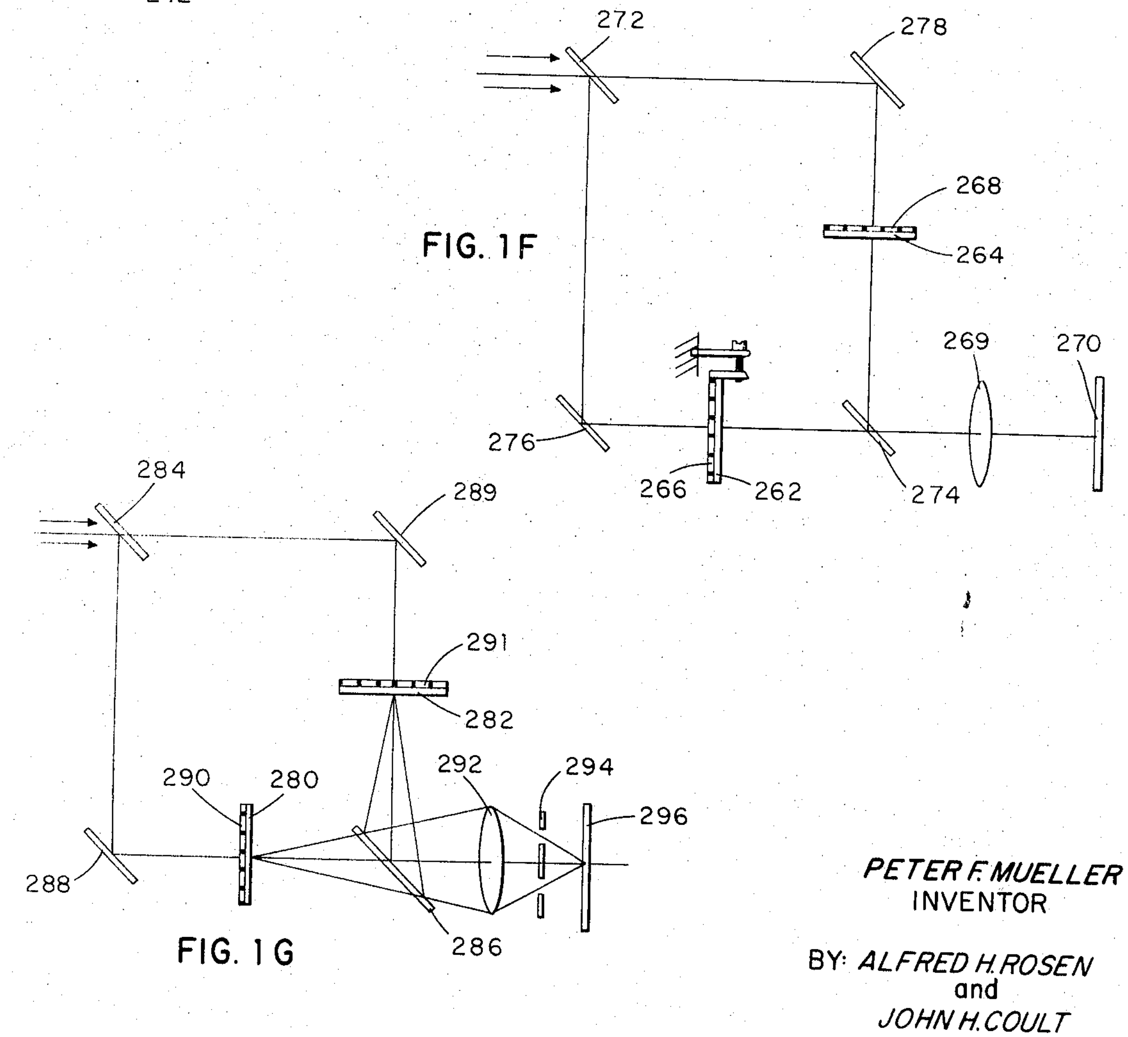
FIG. 1F illustrates an optical system for interlacing a pair of carrier modulating functions to form a composite optical record useful in the practice of this invention.
FIG. 1G illustrates an alternative embodiment of the inventive concepts for effecting Fourier optical synthesis of record functions on discrete record media without the intermediate step of forming a composite record as shown, for example, in FIG. 1D.

FIG. 1G illustrates still another way by which the invention may be practiced. The FIG. 1G system is very similar to the FIG. 1F system but enables the intermediate step of forming a composite record to be eliminated, the complex amplitude addition of the spectra of a pair of records 280 and 282 being performed directly. The FIG. 1G system includes a pair of semi-reflective mirrors 284 and 286 and a pair of totally reflective mirrors 288 and 289, as in the FIG. 1F system. The records 280, 282 are multiplied with amplitude gratings 290, 291 and illuminated in mutually coherent legs of an amplitude-divided spatially coherent, collimated input beam. Fourier transformation of the multiplicative record and carrier functions will thus take place. By appropriately manipulating the mirrors 284, 286, 288, and 289, the respective Fourier spectral distributions can be made to coincide in the region of the back focal plane of projection lens 292. A spatial filter mask 294 similar to the mask 258 in the FIG. 1E system is located in the common Fourier transform space to pass the first spectral orders. By carefully orienting the records 280, 282 such that the respective gratings 290, 291 are effectively azimuthally aligned and spatial phase displaced by a grating half-period, complex amplitude subtraction of the Fourier spectra associated with the transmittance functions of the records 280, 282 will take place. Again, the display at the output image plane 296 represents the optical difference of the record functions 280 and 282.

A very significant application of the principles of my invention, described in part above, is in the field of spectral zonal photography. The production of true color reproductions of a colored photographic scene has engaged workers in the photographic arts since the beginnings of practical photography. One path along which studies were conducted has led to the development of photosensitive materials capable of photostoring color information directly in all the hues of the scene. Another parallel path has been in the direction of storing color information on panchromatic black-and-white film including techniques to retrieve the original color values from the colorless record. A very substantial effort some years ago was concentrated on the concept of zonal recording of color information by imaging the photographic scene through a one (or two) dimensional mosaic spectral filter onto black-and-white photostorage materials. Retrieval of the color information from the black-and-white record required exact registration of the developed record with the taking filter to form a true color reproduction of the scene. The registration and resolution problems inherent in such a technique have proven to be insurmountable obstacles to the commercial viability of this approach.

Yet another approach has involved the use of diffraction gratings to color code a black-and-white record. Such a technique is described in the *British Journal of Photography*, Aug. 3, 1906, pages 609–612 by Herbert E. Ives; in a United States Patent to R.W. Wood, U.S. Pat. No. 755,983, and in a U.S. Patent to Carlo Bocca, U.S. Pat. No. 2,050,417. However, none of these proponents of the use of gratings to color code information on black-and-white film succeeded in avoiding the need to make a plurality of color separation records, and thus their attempts again encompassed the registration limitation. Ives and Wood employ diffraction gratings of disparate frequencies to enable the detection of particular color information in a black-and-white record, however, such methods were plagued by Moire interactions between the gratings. W.E. Glenn has also encountered these Moire beating effects in his exploration of the use of disparate frequency gratings in color systems, particularly in applications to variable optical retardation systems utilizing deformable thermoplastic recording media (see Vol. 48, No. 11, pp. 841–3 of the *Journal of the Optical Society of America*).

As suggested, by this invention techniques of Fourier optical synthesis may be utilized to photostore and retrieve color imagery from a colorless recording medium without many of the problems inherent in the above-described prior art techniques.

I will explain below how my invention may be exploited in three-color systems. However, in the interest of simplicity in understanding the conceptual foundation and practice of spectral zonal photography according to my invention, I will first describe a two-color system of spectral zonal photography utilizing but a single one-dimensional carrier function during the storage process.

Figures 1H, 1I, 1J:
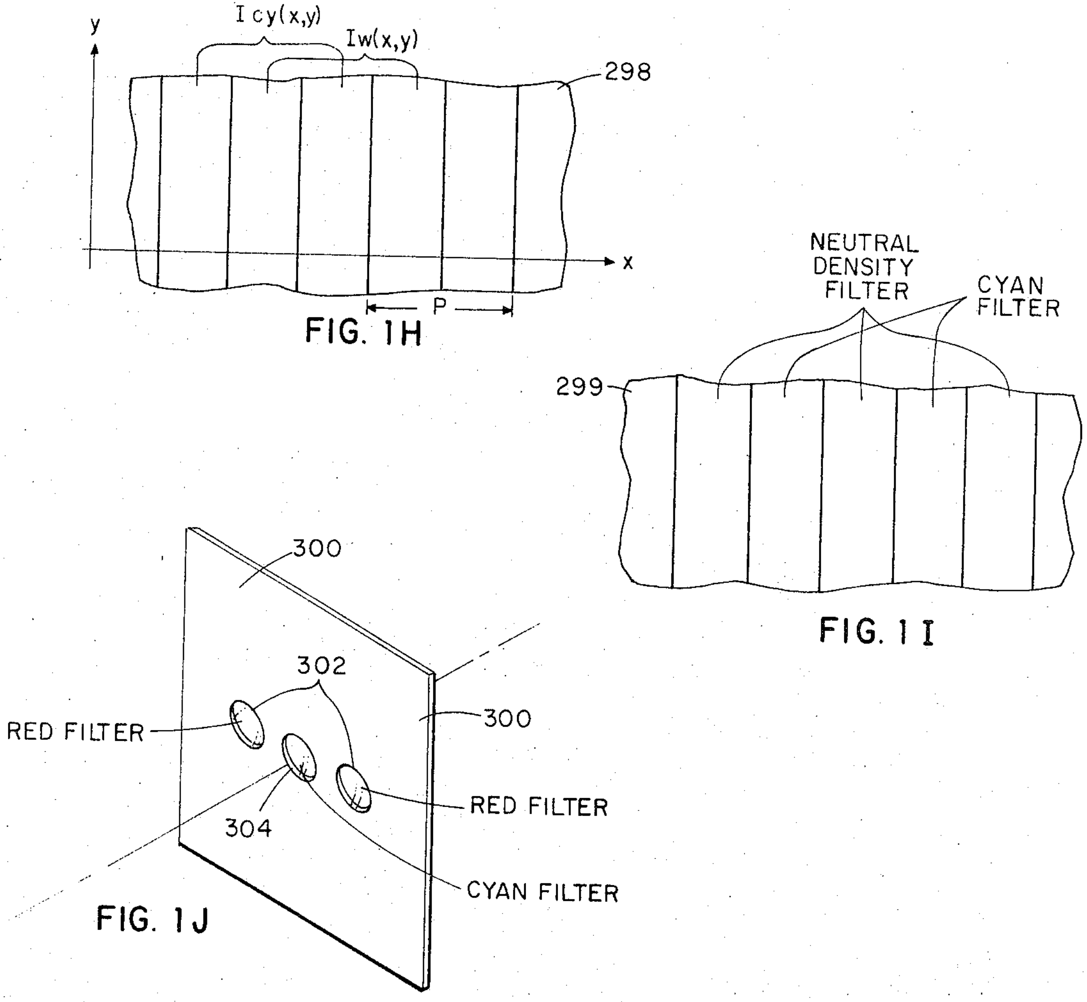
FIG. 1H is a view of a composite optical record formed as a step in a technique of two-color spectral zonal photography implementing my invention.
FIG. 1I is a fragmentary schematic view of a spectral filter useful for forming the composite record shown in FIG. 1H.
FIG. 1J shows a spatial filter mask useful in the practice of two-color spectral zonal photography in accordance with this invention.
Figure 1K:
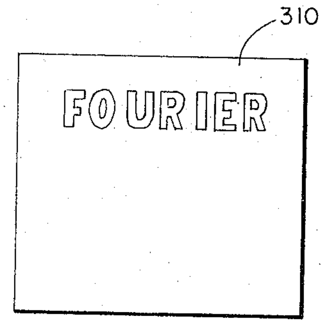
FIGS. 1K–1N illustrate hypothetical objects useful in an illustration of the inventive concepts.
Figure 1L:
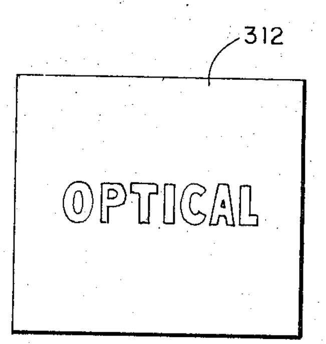
Figure 1M:
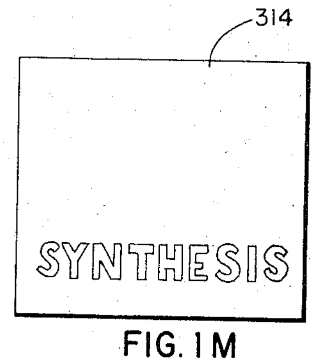
Figure 1N:
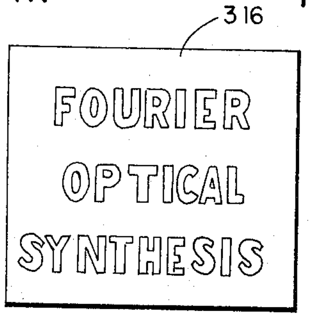
Figure 1O:
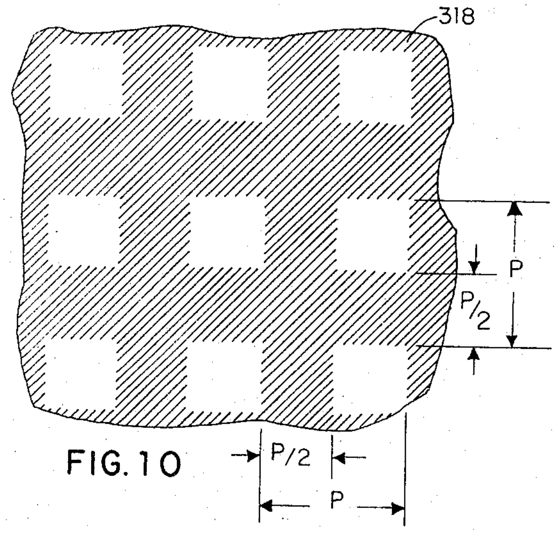
FIG. 1O shows a mask for assisting in interlacing on a common recording medium images of the objects in FIGS. 1K–1N.

A preferred way of implementing such a two-color system is to effect an interlacing on a common black-and-white panchromatic recording medium of two record functions $I_{cy}(x,y)$ and $I_w(x,y)$,$I_{cy}(x,y)$ representing a cyan color separation image of a colored photographic object and $I_w(x,y)$ representing a full spectrum (herein termed for convenience "white") image of the same object. FIG. 1H illustrates, very schematically, how such a composite record 298 might appear.

The amplitude transmittance of record 298 processed to a transparency is given by the relation:

$$T_A(x,y) = I_{cy}(x,y)\ P(x) + I_w(x,y)\ P(x+p/2) \qquad (18)$$

where $P(x)$ is as described in equation (1).

Fourier transforming equation 18 (for example, with a coherent optical system such as shown in FIG. 1E and described above) and following the above mathematical processes and symbols, yields:

$$\tilde{T}_A(\mu_x, \mu_y) = 1/2 \int_{-\infty}^{\infty} \Big( F_{cy}(\mu_x - \sigma, \mu_y)\ \text{sinc}\ 2\pi 1/4\sigma \sum_{-\infty}^{\infty} \delta(\sigma - n/p) \Big) + F_w(\mu_x - \sigma, \mu_y)\ \text{sinc}\ 2\pi 1/4\sigma e^{2\pi i p/2\sigma} \sum \delta(\sigma - n/p) \Big)\, d\sigma \qquad (19)$$

If we consider only the spatial frequency spectrum at the $n=0$ order ($\sigma=0$); equation 19 reduces to:

$$\tilde{T}_A(\mu_x, \mu_y)|_{n=0} = 1/2[F_{cy}(\mu_x, \mu_y) + F_w(\mu_x, \mu_y)] \qquad (20)$$

This distribution is essentially the cyan image spectrum but not exactly since a red image contribution is still present in the $F_w(\mu_{xa}, \mu_y)$spectrum. However, since $F_w(\mu_x,\mu_y) = F_{red}(\mu_x,\mu_y) + F_{cy}(\mu_x, \mu_y)$, equation 20 can be written as $$\tilde{T}_A(\mu_x, \mu_y)|_{n=0} = F_{cy}(\mu_x, \mu_y) + 1/2F_{\text{red}}(\mu_x, \mu_y). \qquad (21)$$

Performing the retransformation of the spectral distribution defined by equation 21 yields a reconstruction, in coordinates $u,v$:

$$T_A(u,v) = I_{cy}(u,v) + 1.2I_{red}(u,v) \qquad (22)$$

which represents a color separation which is predominantly cyan in content.

Considering now the fundamental ($n=1$) spectral order, $**=1/p$ and equation 19 reduces to $$\tilde{T}_A(\mu_x, \mu_y)|_{n=\pm 1} = 1/2[2/\pi F_{cy}(\mu_x - 1/p, \mu_y) - 2/\pi F_w(\mu_x - 1/p, \mu_y)]. \qquad (23)$$

But equation 24 can be reduced to $$\tilde{T}_A(\mu_x, \mu_y)|_{n=\pm 1} = 1/\pi F_{red}(\mu_x - 1/p, \mu_y) \qquad (24)$$

which is the exact red separation scene spectrum.

Retransforming equation 24 produces the relation:

$$T_A(u, v) = (e^{2\pi i p/2u}) I_{\text{red}}(u, v) \qquad (25)$$

Equation 25 squared defines an intensity distribution which represents a pure red color separation image of the scene.

$$T_I(u,v) = I^2_{red}(u,v) \qquad 26$$

A number of ways are available for implementing such a two-color technique. One way is to first record the full color scene in a normal copy camera on a panchromatic black-and-white film through a subtractive filter (cyan, for example), placing a grating over the exposed record and re-exposing through a filter of the complementary color (red, in this instance). Since the additive red and cyan exposures are equivalent to a full spectrum exposure, the resulting composite record represents an interlace of a full spectrum image with a cyan color separation image. The record thus formed is preferably (although not mandatorily) reversal processed to a gamma of minus two, for example, by first developing for 5 minutes in DK–50 (2:1) at 68° F, washing for 30 seconds, bleaching in a dichromate bleach for 3 minutes, washing and cleaning, flooding for 20 seconds under a 100 watt lamp, developing a second time in D–94 for 2 minutes, washing again, fixing, hyponeutralizing, and then drying.

A preferred technique for producing such a composite record on which a full spectrum scene image is interlaced with a subtractive color (cyan, for example) separation image of the scene is to employ a novel spectral filter of my design in the nature of a grating having alternate neutral density and cyan filter strips, as shown fragmentarily at 299 in FIG. 1I. Such a filter 299 may be fabricated in a number of ways, certain of which are described in detail hereinafter in connection with a description of three-color spectral zonal photographic techniques which may be employed to put my invention into practice.

With such a filter, a composite record as described is formed very simply by erecting an image of the scene, multiplying the image with the filter, and recording the multiplicative combination on a panchromatic black-and-white emulsion. In a preferred arrangement, the filter is located at the plane of the first image formed of the scene in intimate contact with the film.

After processing the exposed storage medium, a color reconstruction of considerable fidelity may be retrieved from the record in a coherent optical system substantially as shown in FIG. 1E, described above, but modified by the substitution of a spatial filter mask 300 as shown in FIG. 1J for the mask 258. The mask 300 has a pair of apertures 302 for passing the first order spectra produced by the record and a third aperture 304 located on the optical axis for passing the D.C. information. Apertures 302 are covered by a red spectral filter and aperture 304 is covered by a cyan spectral filter in order that spectra passed by mask 300 be transmitted in light having the corresponding wavelength characteristics. As described above, the information transmitted in the diffracted orders through the apertures 302 characterize a spatial frequency spectrum associated with the red content of the photographed scene, and the information transmitted in the D.C. channel through the aperture 304 characterizes a spatial frequency spectrum which represents predominantly the cyan content of the scene.

Records of the reproductions which I have generated using this system do not exhibit a full spectrum of natural colors, due to the inherent limitations of two color systems and the described adulteration of the cyan spectra; however, the color reproductions are found to be very aesthetically pleasing and highly saturated in the colors transmitted in predominance by the system. Thus, a novel system has been described which for the first time makes practicable spectral zonal photography with colorless record media. The only additional requirement imposed by the described system over conventional black-and-white photography is the introduction of a spectral filter into the exposing light, as described. In its simplest application, a conventional camera is modified by permanently locating a spectral filter, as described, at the image plane of the objective.

Thus far, the invention has been mathematically and physically analyzed in terms of a one-dimensional carrier in the interest of simplicity. The principles underlying the invention are more general, however. Various difference signals can be generated by extending the basic concept of the one-dimensional interlace scheme above to a two-dimensional scheme.

In the following analysis let $I_i(x,y)$ represent the amplitude transmittance of the $i^{th}$ record image after processing. The total amplitude transmittance of the record, then, is:

$$T_A(x,y) = I_1(x,y)\ P(x)\ P(y) + I_2(x,y)\ P(x+p/2)\ P(y) + I_3(x,y) P(x+p/2)\ P(y+p/2) + I_4(x,y)\ P(x)\ P(y+p/2).$$

The Fourier transform of:

$$P(x)\rightarrow\tilde{P}(\sigma)=1/2\ \text{sinc}\ 2\pi p/4\sigma\sum_{n=\infty}^{\infty}\delta(\sigma-n/p)\qquad(27)$$

$$P(x+p/2)\rightarrow\tilde{P}'(\sigma)=e^{2\pi ip/2\sigma}\tilde{P}(\sigma),\qquad(28)$$

$$P(y)\rightarrow\tilde{P}(\xi)=1/2\ \text{sinc}\ 2\pi p/4\xi\sum_{n=\infty}^{\infty}\delta(\xi-m/p),\ \text{and}\qquad(29)$$

$$P(y+p/2)\rightarrow\tilde{P}'(\xi)=e^{2\pi ip/2\xi}\tilde{P}(\xi).\qquad(30)$$

Therefore, the Fourier Transform of equation 26 in variables $\mu_x$, $\mu_y$ and dummy variables of integration $\delta$, $\xi$, is $$\tilde{T}_A(\mu_x,\mu_y)=\int_{-\infty}^{\infty}\int_{-\infty}^{\infty}[\tilde{I}_1(\mu_x-\sigma,\mu_y-\xi)1/2\ \text{sinc}\ 2\pi p/4\sigma\sum_{n=-\infty}^{\infty}\delta(\sigma-n/p)1/2\ \text{sinc}\ 2\pi p/4\xi\sum_{n=-\infty}^{\infty}\delta(\xi-m/p)$$
$$+\tilde{I}_2(\mu_x-\sigma,\mu_y-\xi)e^{2\pi ip/2\sigma}1/2\ \text{sinc}\ 2\pi p/4\sigma\sum_{n=-\infty}^{\infty}\delta(\sigma-n/p)1/2\ \text{sinc}\ 2\pi p/4\xi\sum_{m=-\infty}^{\infty}\delta(\xi-m/p)$$
$$+\tilde{I}_3(\mu_x-\sigma,\mu_y\xi)e^{2\pi ip/2\sigma}1/2\ \text{sinc}\ 2\pi p/4\sigma\sum_{n=-\infty}^{\infty}\delta(\sigma-n/p)e^{2\pi ip/2\xi}1/2\ \text{sinc}\ 2\pi p/4\xi\sum_{m=-\infty}^{\infty}\delta(\xi-m/p)$$
$$+\tilde{I}_4(\mu_x-\sigma,\mu_y-\xi)1/2\ \text{sinc}\ 2\pi p/4\sigma\sum_{n=-\infty}^{\infty}\delta(\sigma-n/p)e^{2\pi ip/2\xi}1/2\ \text{sinc}\ 2\pi p/4\xi\sum_{m=-\infty}^{\infty}\delta(\xi-m/p)]d\sigma d\xi,\qquad(31)$$

where $n$ represents delta function components (orders) in the $\mu_x$ dimension and $m$ represents delta function components in the $\mu_y$ dimension.

Considering the orders $n=\pm1$, $m=0$ ($\delta=1/p$, $\xi=0$)

$$\tilde{T}_A(\mu_x,\mu_y)|_{\substack{n=\pm1\\m=0}}=1/2\pi[\tilde{I}_1(\mu_x-1/p,\mu_y)-\tilde{I}_2(\mu_x-1/p,\mu_y)-\tilde{I}_3(\mu_x-1/p,\mu_y)+\tilde{I}_4(\mu_x-1/p,\mu_y)].\qquad(32)$$

Considering the $n=\pm1$, $m=\pm1$ orders ($\sigma=1/p$, $\xi=1/p$), $$\tilde{T}_A(\mu_x,\mu_y)|_{\substack{n=\pm1\\m=\pm1}}=1/\pi^2[\tilde{I}_1(\mu_x-1/p,\mu_y-1/p)-\tilde{I}_2(\mu_x-1/p,\mu_y-1/p)+\tilde{I}_3(\mu_x-1/p,\mu_y-1/p)\ \tilde{I}_4(\mu_x-1/p,\mu_y-1/p)]\qquad(33)$$

For $n=0$, $m=\pm1$ $$\tilde{T}_A(\mu_x,\mu_y)|_{\substack{n=0\\m=\pm1}}=1/2\pi[\tilde{I}_1(\mu_x,\mu_y-1/p)+\tilde{I}_2(\mu_x,\mu_y-1/p)-\tilde{I}_3(\mu_x,\mu_y-1/p)-\tilde{I}_4(\mu_x,\mu_y-1/p)].\qquad(34)$$

And, finally, for $n=0$, $m=0$ $$\tilde{T}_A(\mu_x,\mu_y)|_{\substack{n=0\\m=0}}=1/4[\tilde{I}_1(\mu_x,\mu_y)+\tilde{I}_2(\mu_x,\mu_y)+\tilde{I}_3(\mu_x,\mu_y)+\tilde{I}_4(\mu_x,\mu_y)].\qquad(35)$$

As indicated, the equations 32–35 are general. In one application of the invention, let $$I_4(x,y)=I_1(x,y)+I_2(x,y)+I_3(x,y).\qquad(36)$$

Then the following reductions occur:

$$\tilde{T}_A(\mu_x,\mu_y)|_{\substack{n=\pm1\\m=0}}=1/\pi\tilde{I}_1(\mu_x-1/p,\mu_y)\qquad(37)$$

$$\tilde{T}_A(\mu_x,\mu_y)|_{\substack{n=\pm1\\m=\pm1}}=-2(1/\pi)^2\tilde{I}_2(\mu_x-1/p,\mu_y-1/p)\qquad(38)$$

$$\tilde{T}_A(\mu_x,\mu_y)|_{\substack{n=0\\m=\pm1}}=-1/\pi\tilde{I}_3(\mu_x,\mu_y-1/p)\qquad(39)$$

$$\tilde{T}_A(\mu_x,\mu_y)|_{\substack{n=0\\m=0}}=1/2[\tilde{I}_1(\mu_x,\mu_y)+\tilde{I}_2(\mu_x,\mu_y)+\tilde{I}_3(\mu_x,\mu_y)].\qquad(40)$$

Upon retransforming, $$T_A(u,v)|_{\substack{n=\pm1\\m=0}}=1/\pi e^{2\pi ip/2u}I_1(u,v),\qquad(41)$$

$$T_A(u,v)|_{\substack{n=\pm1\\m=\pm1}}=-2(1/\pi)^2e^{2\pi ip/2(u+v)}I_2(u,v),\qquad(42)$$

$$T_A(u,v)|_{\substack{n=0\\m=\pm1}}=-1/\pi e^{2\pi ip/2v}I_3(u,v),\ \text{and}\qquad(43)$$

$$T_A(u,v)|_{\substack{n=0\\m=0}}=1/2[I_1(u,v)+I_2(u,v)+I_3(u,v)],\qquad(44)$$

with the corresponding image intensity distributions $$T_I(u,v)|_{\substack{n=\pm1\\m=0}}\propto I_1^2(u,v)\qquad(45)$$

$$T_I(u,v)|_{\substack{n=\pm1\\m=\pm1}}\propto I_2^2(u,v)\qquad(46)$$

$$T_I(u,v)|_{\substack{n=0\\m=\pm1}}\propto I_3^2(u,v),\ \text{and}\qquad(47)$$

$$T_I(u,v)|_{\substack{n=0\\m=0}}\propto I_4^2(u,v).\qquad(48)$$

The validity of the above mathematical statements may be substantiated as follows. Expose a photographic emulsion sequentially to objects 310,312, 314, and 316 (shown in FIGS. 1K–1N), object 316 representing the optical sum of objects 310, 312, and 314. While so doing, multiply a mask 318, as shown in FIG. 1 O, with the respective objects, shifting the mask 318 after each exposure by one-half period $p$ to expose the entire film area. A mosaic composite record is thus formed comprising a two-dimensional array of four element mosaic units, as shown in FIG. 1P.

Process the composite record to a transparency and locate same in a coherent optical system such as is shown in FIG. 1E. The diffraction pattern formed, comprising a Fourier transformation of the complex amplitude transmittance function of the record, appears (in part) as shown in FIG. 1Q.

Figure 1P:
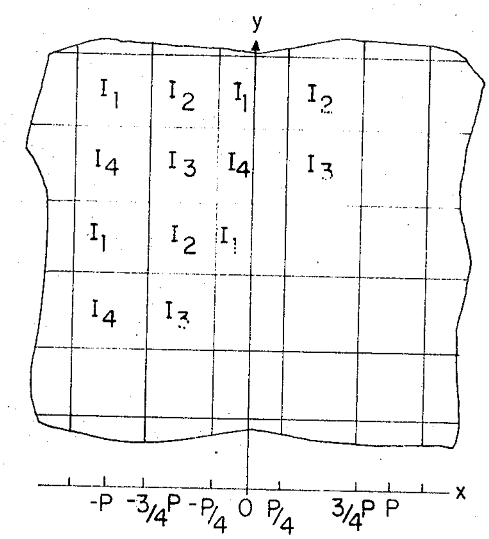
FIG. 1P depicts a composite record fabricated in the form of a mosaic, the mosaic comprising a plurality of mosaic units each having four elements representing four distinct record functions.
Figure 1Q:
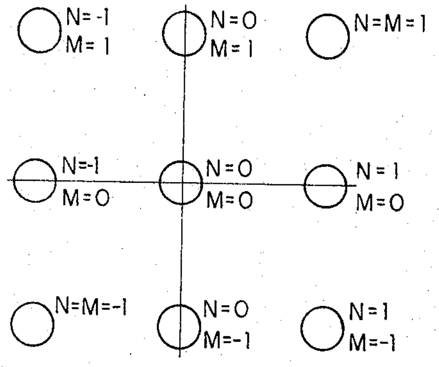
FIG. 1Q portrays a portion of the diffraction pattern which might be formed in a Fourier transform space established within a coherent optical system, such as shown in FIG. 1E, of the FIG. 1K record.

Assume that images $I_1$, $I_2$, $I_3$, and $I_4$, as shown in FIG. 1P, are respectively images of objects 1K, 1L, 1M, and 1N. Then, by selectively transmitting through Fourier transform space (with a spatial filter mask similar to masks 258 described above) the $n=\pm1$, $m=0$ orders, an image $I_1(u,v)$ (the word "FOURIER") alone is retrieved. Similarly, the words "OPTICAL" and "SYNTHESIS" alone may be recovered by filtering out all spectra in the transform plane except the orders $n=\pm1$, $m=\pm0$; and $n=0$, $m=\pm1$. Filtering for $m=n=0$ recovers the sum function $I_4(u,v)$.

The above mathematical analysis shows that this system is exact in the sense that the Fourier transformation of a composite mosaic record, formed as described, contains no interference ("cross-talk") terms which might degrade the recovered images. The system is further enhanced by its relative insensitivity to variations in the processing of the composite record.

The results obtained from the assumption of equation 36 are particularly useful to implement an exact system for three zone spectral photography. For spectral zonal photography all that is required is a particularly simple mosaic filter 322 of the geometry shown schematically in FIG. 1R wherein the symbols G, R, B, and W respectively represent green, red, blue, and clear spectral filter elements. As with the two color system described above, to form a composite record, the filter 322 is multiplied with an image of the scene to be photographed and the product is recorded on a panchromatic emulsion.

Figure 10:
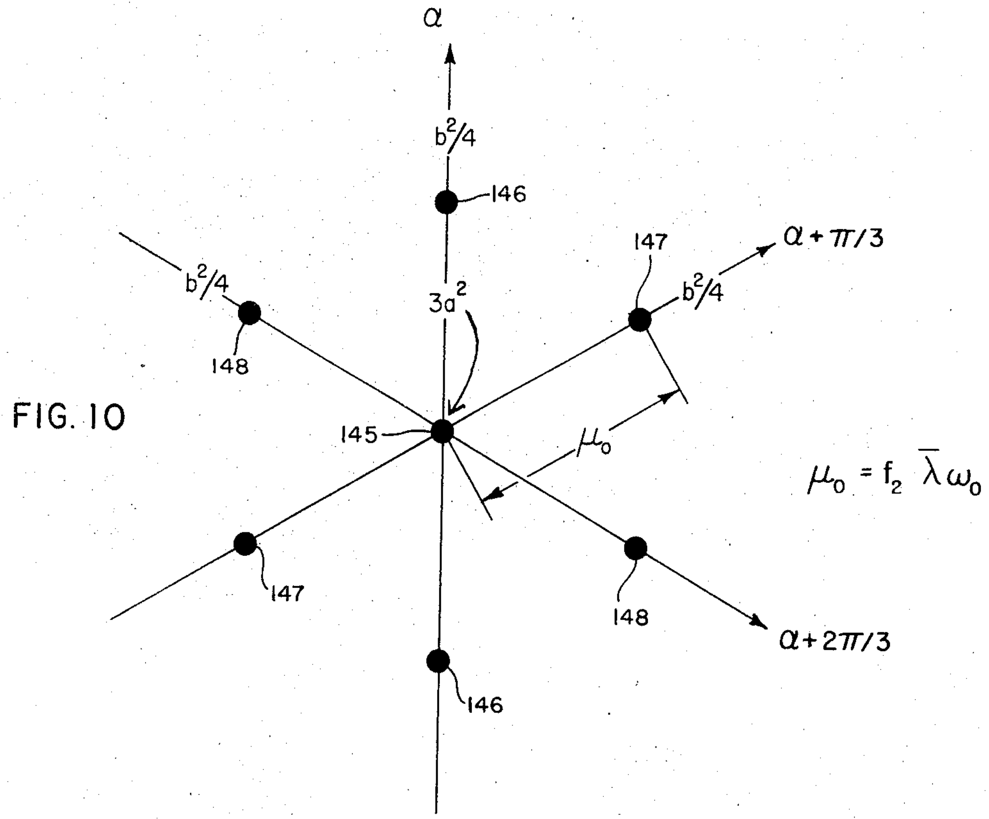
FIG. 10 is a detail sketch illustrating the Fourier transform configuration used in the systems of FIGS. 9A and 9B.

Alternatively, the composite record may be made by four consecutive exposures through a position-sequenced mask, such as mask 318 in FIG. 10 while appropriately imposing red, green, and blue spectral filters in the exposure light path.

To retrieve a full color reconstruction of the photographed scene from a mosaic spectral zonal record thus formed, the record is placed in a coherent optical system, such as described above, and the diffracted orders produced in the transform space within the system are selectively passed through a spectral filter having a dominant transmitted wavelength corresponding to the color representation of the particular filtered spatial frequency spectrum. For example, the order containing a spatial frequency spectrum characterizing the blue scene content is filtered with a blue filter.

Similarly, the green and red color separation spectra are respectively filtered through green and red filters. The color values and detail of resultant reconstruction are a faithful and accurate reproduction of those of the original scene.

A technique of spectral zone photography employing two-dimensional carries to record and retrieve exact (no color or structure cross-talk) three-color information has been described. The use of such a system, however, requires the fabrication of a mosaic spectral filter comprising a large number of four-element mosaic units.

Figure 1R:
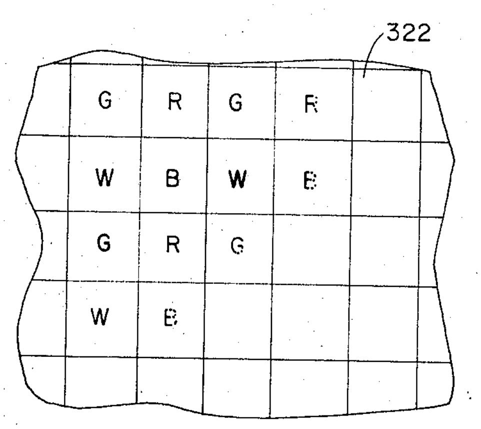
FIGS. 1R and 1S illustrate spectral filters which might be fabricated to practice other three-color spectral zonal photographic systems utilizing the principles of this invention.
Figure 1S:
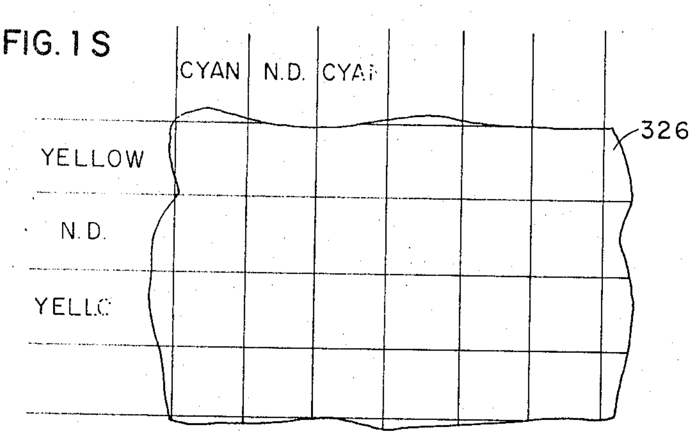

Yet another embodiment of the inventive concepts concerns a three-color system which has the advantage that the spectral filter used is much simpler to fabricate than the mosaic filter 322 shown in FIG. 1R. FIG. 1S illustrates a filter 326 designed to carry out this embodiment of the invention. The FIG. 1S filter is fabricated by multiplying a one-dimensional cyan-neutral filter with an orthogonally oriented yellow-neutral filter. This composite filter may thus be constructed by making the cyan-neutral filter separately and then overlapping them with a 90° angular displacement. The end result is again a mosaic geometry with the mosaic elements constituting each of the mosaic units representing green, yellow, cyan, and neutral filters instead of the red, green, blue, and neutral filter elements in the FIG. 1R filter.

Following the mathematical processes set forth above, it is easily shown that a spectral zone record formed with the filter 326 has a Fourier transform in which: (1) the $n=\pm1$, $m=0$ and n = 0, m=±1 orders contain the exact red and blue spectra; (2) the $n=\pm1$, $m=\pm1$ orders vanish; and (3) the $m=0$, $n=0$ order represents a green color separation spectrum degraded by a scene luminance spectrum. Using the retrieval techniques brought forth above, color reconstructions of substantial fidelity may be produced.

I have described above a number of spectral zonal photographic techniques for photostoring and retrieving scene color and structure information. A simple but effective two-color system was described. Subsequently, an exact three-color system employing a red-blue-green-neutral mosaic filter was discussed. There followed a discussion of a three-color system using a filter comprising orthogonally arranged filters each comprising interlaced neutral and subtractive filter strips.

I will now describe yet another system of three-color spectral zonal photography utilizing the concepts of my invention to store and retrieve substantially exactly color information from a photographed scene with a filter comprising three angularly displaced overlapped subtractive color-neutral filters. Photostorage and recovery of color information is achieved without fabricating a complicated mosaic filter, "cross-talk" spectra produced in the transform plane being effectively eliminated by selective spatial filtering in the Fourier transform plane established within a coherent optical retrieval system.

This description constitutes essentially the specification of my application Ser. No. 564,340, filed July 11, 1966, of which this application is a continuation-in-part. At the time this application was prepared, the Fourier synthesis principles underlying the operation of the three-color system described and claimed therein were not fully appreciated. As seen below, the subtractive color-neutral filter was described not in terms of Fourier optical synthesis, although inherent, but rather in terms of the periodic subtractive color filter elements respectively modulating the color separation image of the complementary color. This, of course, is an accurate description, but is not as fundamental as a description in terms of Fourier optical synthesis. The specification of this parent application, in part, follows. The basic equation for a color scene may be described as:

$$I_w(\underline{x}, \lambda) = I_{\bar{\lambda}_1}(\underline{x}) + I_{\bar{\lambda}_2}(\underline{x}) + \ldots I_{\bar{\lambda}_n}(\underline{x}) \qquad \text{(Relation 51)}$$

Where:

$I_w(\underline{x}, \lambda)$ represents the intensity distribution of light over the scene as a function of spatial coordinates $(\underline{x})$ and wavelength $(\lambda)$; and $I_{\bar{\lambda}_i}(\underline{x})$ represents the intensity distribution in the wavelength band $\bar{\lambda}_i$ as a function of spatial coordinates $(\underline{x})$; and $\bar{\lambda}_i$ is the average wavelength in the band from $$\lambda_i = \Delta\lambda_i \text{ to } \lambda_i + \Delta\lambda_i$$

This basic equation describes the energy distribution in the image plane of a camera. When the color components are blue, green and red, the energy distribution is the sum of three components at each point in the scene.

In the final storage of color-coded information in a color-blind (e.g.; black-and-white) recording from which the original color scene can be reconstructed, one would like the storage to be according to the following equation:

$$I_w(\underline{x}, \lambda) \cdot \Pi(\underline{x}, \lambda) = I_{\bar{\lambda}_1}(\underline{x}) \cdot P(\underline{x})|_{\alpha_1} + I_{\bar{\lambda}_2}(\underline{x}) \cdot P(\underline{x})|_{\alpha_2} + \ldots I_{\bar{\lambda}_n}(\underline{x}) \cdot P(\underline{x})|_{\alpha_n} \qquad \text{(Relation 52)}$$

Where:

$I_w(\underline{x}, \lambda) \cdot \Pi(\underline{x}, \lambda)$ represents the intensity distribution $I_w(\underline{x},\lambda)$ multiplied by the total periodic modulation$(\Pi)$of the periodic modulations on all wavelength bands as a function of spatial coordinates $(\underline{x})$ in the scene and wavelength $(\lambda)$; and $$I_{\bar{\lambda}_i}(\underline{x}) \cdot P(\underline{x})|_{\alpha_i}$$

represents the intensity distribution in the wavelength band as a function of spatial coordinates $(\underline{x})$ multiplied by the periodic modulation $(P)$ of the light in that band as a function of spatial coordinates $(\underline{x})$ with the azimuthal characteristic $\alpha^i$. It will be understood that the wavelength bands can be blue, green and red, and the periodic modulations can be given azimuthal characteristic oriented at angles $\alpha$, $a+\pi/3$ and $\alpha+2\pi/3$, respectively, as one fairly obvious example, in which case Relation 52 would take the form:

$$I_w(\underline{x}, \lambda) \cdot \Pi(\underline{x}, \lambda) = I_B(\underline{x}), P(\underline{x})|_{\alpha} + I_G(\underline{x}) \cdot P(\underline{x})|_{\alpha+\pi/3} + I_R(\underline{x}) \cdot P(\underline{x})|_{\alpha+2\pi/3} \qquad \text{(Relation 52A)}$$

Figure 2:
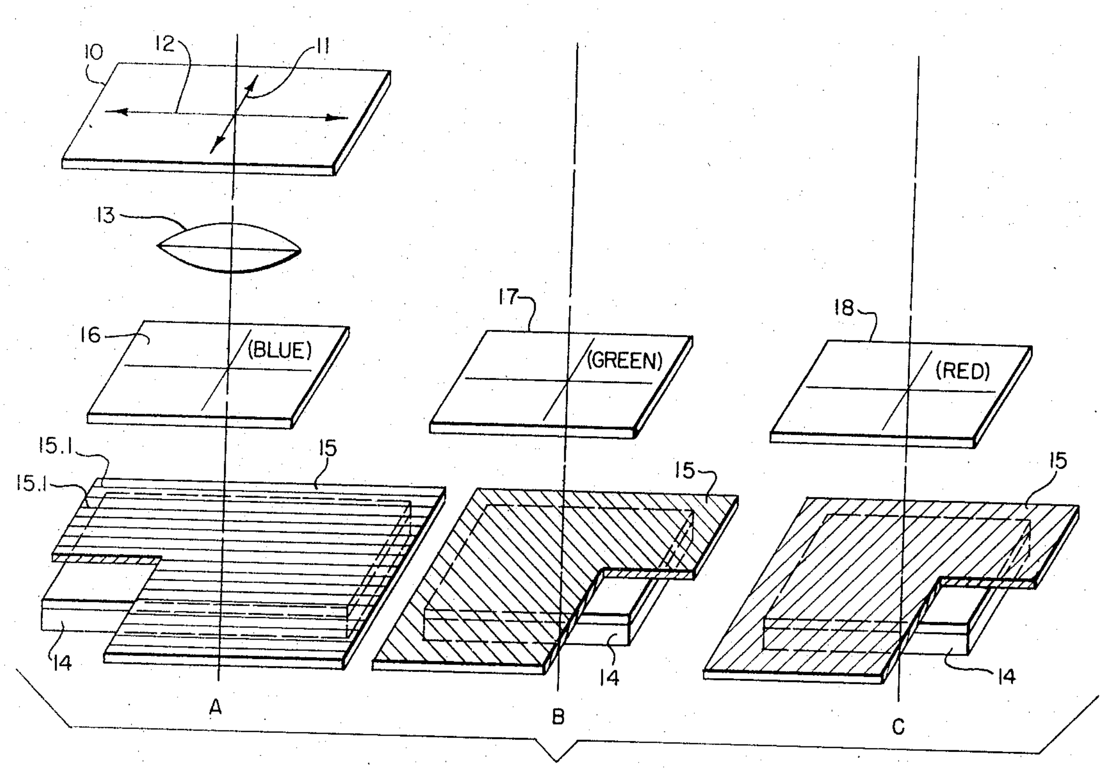
FIGS. 2A–C illustrate the steps of a process for sequentially storing spectral zonal information for three separate zones with unique periodic intensity modulations in a single black-and-white storage medium.
FIG. 2D schematically illustrates the separate spectral-zonal images stored by the individual steps of FIG. 2.
Figure 2D:
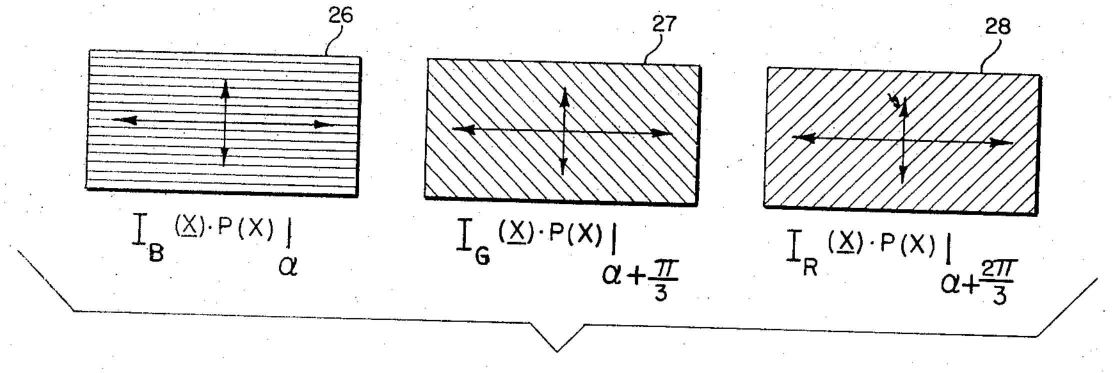

Referring to FIGS. 2 and 2D, an object 10, which for the sake of illustration may be a photographic color transparency in which there is a two-dimensional image represented by the double-headed arrows 11 and 12, is imaged by optical means represented by lens 13 onto a color-blind photostorage material 14, a suitable example of which is panchromatic black and white photographic film, preferably of the high contrast and high resolution variety. The object 10, optics 13 and photostorage material 14 remain fixed relative to one another throughout the process about to be described. The source of light (not shown) may be any available white light, such as daylight.

As shown in FIG. 2A a blue filter 16 is interposed between the object 10 and photostorage material 14, and a diffraction grating 15 is interposed between the filter and the photostorage material, for example, directly on the photostorage material. The diffraction grating may be any suitable grating of periodic opaque and transparent regions, for example, in the configuration of a Ronchi ruling having opaque lines 15.1 on a transparent support. The showing in FIG. 2 is exemplary only and does not represent any particular form of grating.

The grating can be placed at various locations between the object 10 and the photostorage material 14 as long as the grating and the object are imaged as a product in the photostorage; that is, the object 10 and the grating 15 should be optically multiplied in the photostorage material 14, and not merely added therein. This can be done, for example, by placing the grating directly in contact with the photostorage material 14. The image which is recorded by incoherent illumination through the blue filter 16 will then be the product of the intensity due to blue light as a function of the coordinates $\underline{x}$ in the recorded image and, in the present illustration, the periodic variation of the grating 15 in a single dimension $x$ oriented in a prescribed azimuthal direction $\alpha$, as indicated at 26 in FIG. 2D immediately beneath FIG. 1A.

FIG. 2B is identical to FIG. 2A except that a green filter 17 has been substituted for the blue filter and the grating 15 has been rotated in azimuth 60° ($\pi/3$) about the axis of the system. Another exposure of the object 10 is then made, which records another image in the photostorage material 14 as shown at 27 in FIG. 2D immediately below FIG. 2B. This image is mathematically described as the product of intensity due to exposure of the object through the green filter 17 as a function of the spatial coordinates $\underline{x}$ and the periodic function of the grating in a single dimension $x$ oriented in the azimuthal direction $\alpha+\pi/3$. A third exposure is then made as illustrated at FIG. 2C through a red filter 18 with the grating 15 rotated a further 60 ($2\pi/3$) degrees to place on the photostorage material 14 a third image illustrated at 28 in FIG. 2D immediately below FIG. 2C, which is mathematically described as the product of the intensity of the exposure of the object 10 through the red filter 18 as a function of spatial coordinates ($\underline{x}$) and the periodic variation of the grating in a single dimension $x$ oriented in the azimuthal direction $\alpha+2\ \pi/3$.

Figure 3:
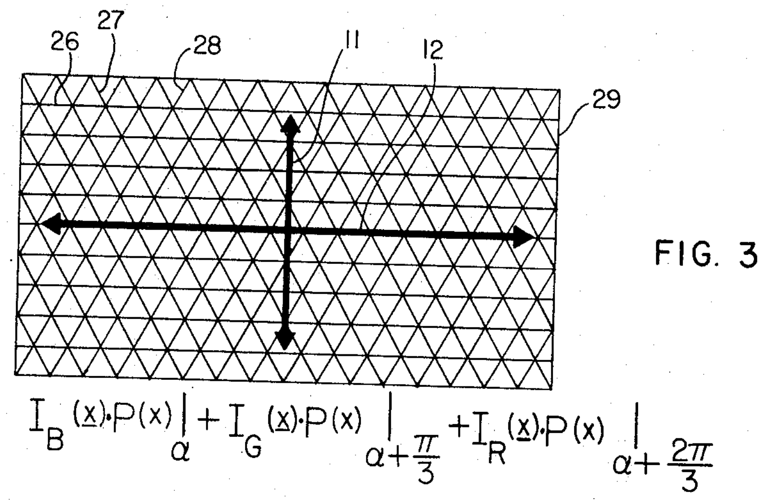
FIG. 3 schematically illustrates the final storage of three spectral zonal images obtained with the process of FIG. 2.

These three exposures are added in the final black-and-white storage 29, which is schematically illustrated in FIG. 3, where the double-headed arrows 11 and 12 representing the original object have been reproduced and the grating images 26, 27 and 28 are superposed in the same recording area. The mathematical sum of the three products shown in FIG. 2D is set out under FIG. 3. This is the final storage of color-coded information in the colorblind (black-and-white) image, according to relation 52 from which the original color scene can be reconstructed by Fourier transform techniques and spatial and spectral filtering. The stored image 29 is desirably a transparency.

The system illustrated in FIG. 2 has the virtue not heretofore available that the scene being photographed, the recording medium on which it is being photographed, and the optical elements which focus the image of the scene on the recording medium, all remain fixed relative to each other throughout the entire process of recording the coded images representative of the color bands into which the scene is broken down. Thus, since separate color coded images are not made on separate pieces of recording media, the problem of registering such images is eliminated. The final color-coded black-and-white record shown in FIG. 3 is obtained directly, without the intervention of the separate records of elemental color-coded images. The three diapositives mentioned in Bocca patent No. 2,050,417, for example, are eliminated completely.

Figure 4B:
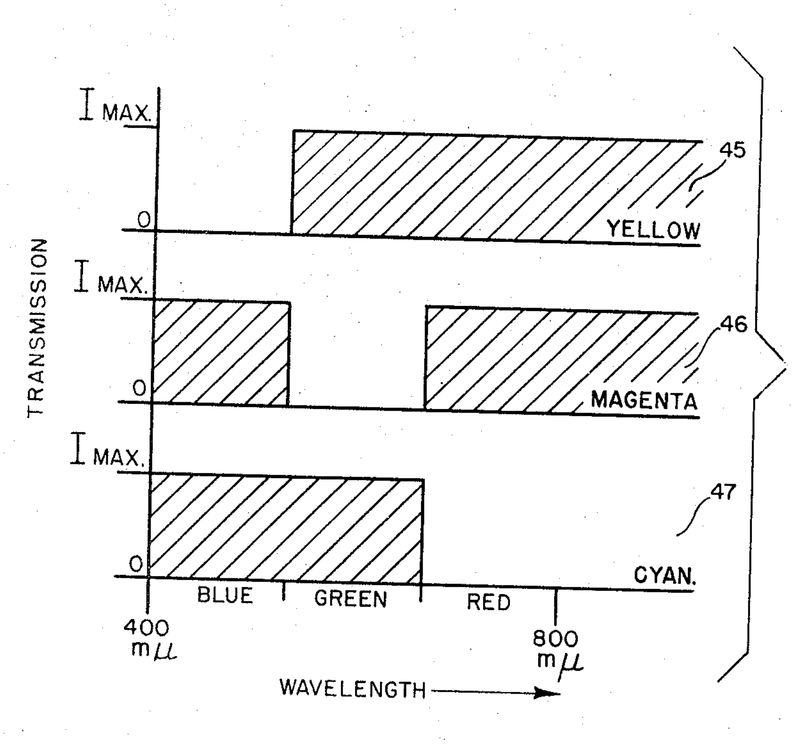
FIG. 4B is a graph illustrating the ideal transmissivities of the filter elements of FIG. 4A.
Figures 4A, 8:
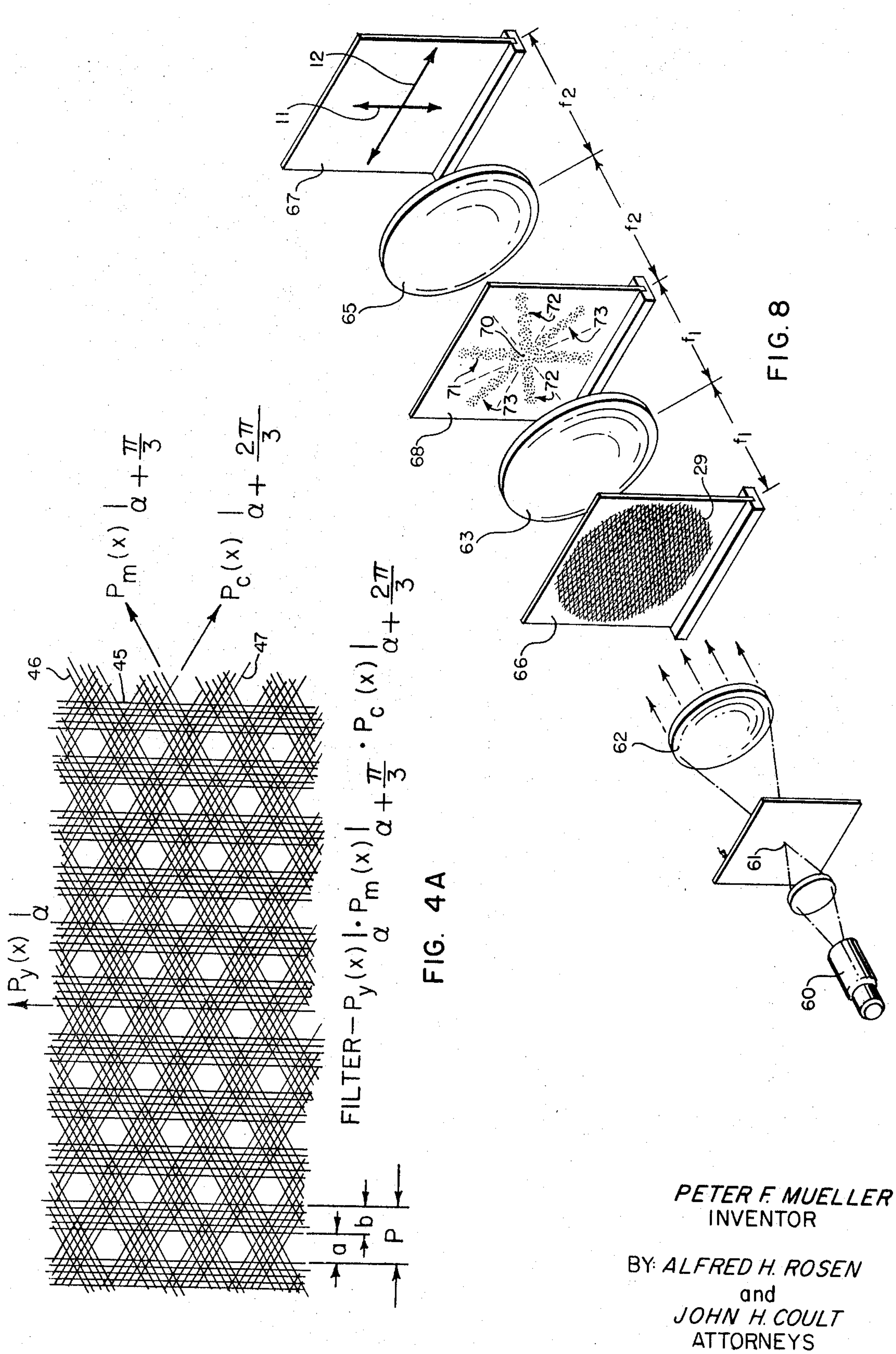
FIG. 4A illustrates a spectral zonal filter of the subtractive or negative type suitable for simultaneous storage of three spectral zones of a scene with unique periodic modulations in a black-and-white or other "color-blind" but panchromatic storage medium.
FIG. 8 illustrates a system for reconstructing color images by means of a Fourier transform of the stored record and spatial and spectral filtering.

FIG. 4A illustrates a "negative" color filter consisting of the superposition of three colored Ronchi rulings having respective unique azimuthal characteristics, e.g; rotated in $\pi/3$ increments from one another. FIG. 4B shows ideally the required spectral transmissions of the respective rulings. A first array of bars 45 of width "$b$" in FIG. 4A represent yellow bars, with transparent bars of width "$a$" intervening; these comprise a yellow Ronchi ruling having periodicity P ($\underline{x}$), which generally is represented mathematically by $$P_y(\underline{x})|_{\alpha_y}.$$

Similarly, a magenta ruling 46 is generally represented by $$P_m(\underline{x})|_{\alpha_m};$$

and a cyan ruling 47 is generally represented by $$P_c(\underline{x})|_{\alpha_c}.$$

In each of these rulings the respective transmission spectra in FIG. 4B refer to the absorbing portion of the ruling (the portion that would be opaque in a ruling consisting of opaque bars or lines separated by transparent bars or lines), while the intervening portions are preferably transparent passing all visible wavelengths substantially unattenuated.

The three rulings are superposed, so that they are multiplied each with the others, and the product of their respective modulations as a function of spatial coordinates $\underline{x}$ and wavelength $\lambda$ is:

$$\pi(\underline{x},\lambda)=P_y(\underline{x})|_{\alpha_y}\cdot P_m(\underline{x})|_{\alpha_m}\cdot P_c(\underline{x})|_{\alpha_c} \qquad \text{(Relation 53)}$$

Where:

($\underline{x}$, $\lambda$) represents the product of the periodic yellow, magenta and cyan modulations as a function of spatial coordinates ($\underline{x}$) and wavelength ($\lambda$).

FIG. 4A shows a special case of Relation 53. At a first glance, it might not appear that multiplication of Relation 51 with Relation 53 would yield relation 52. For example, the blue term in relation 52 would appear to come out:

$$\pi(\underline{x},\lambda)\cdot I_B(\underline{x})=I_B(\underline{x})\cdot P_y(x)|_{\alpha_y}P_m(x)|_{\alpha_m}P_c(x)|_{\alpha_c}$$

When it is realized, however, that the magenta and cyan filters each transmit blue, and that the blue light does not "see" these filters, it is apparent that the terms involving $P_m$ and $P_c$, should not appear in practice. Ideally, the transmittance of blue through magenta and cyan filters is unity, in the sense that the magenta and cyan filters are not a function of the spatial coordinates ($\underline{x}$) for blue; thus, the terms $P_m$ and $P_c$ are constants with relation to ($\underline{x}$), and have a value of unity for an ideal dye, so that, for practical purposes we can set:

$$\pi(\underline{x}),\lambda)\cdot I_B(\underline{x})=I_B(\underline{x})\cdot P_y(\underline{x})|_{\alpha_y} \qquad \text{(Relation 54)}$$

That is, the blue light is modulated, essentially, only by the yellow filter. Similarly:

$$\pi(\underline{x},\lambda)\cdot I_G(\underline{x})=I_G(\underline{x})\cdot P_m(\underline{x})|_{\alpha_m} \qquad \text{(Relation 55)}$$

$$\pi(\underline{x},\lambda)\cdot I_R(\underline{x})=I_R(\underline{x})\cdot P_c(\underline{x})|_{\alpha_c} \qquad \text{(Relation 56)}$$

Hence multiplication of the scene (relation 51) with the "-negative" filter (relation 53) yields Relation 52 in the form:

$$I_w(\underline{x}, \lambda) \cdot \pi(\underline{x}, \lambda) = I_B(\underline{x}) \cdot P_y(\underline{x})\Big|_{\alpha_y} + I_G(\underline{x}) \cdot P_m(\underline{x})\Big|_{\alpha_m} + I_R(\underline{x}) \cdot P_c(\underline{x})\Big|_{\alpha_c} \qquad \text{(Relation 52B)}$$

The "negative" color filter consists of negative or subtractive color dyes on a background which may be transparent to white light.

Multiplicative filters according to FIG. 4A may be made by the process illustrated in FIG. 2, using any commercially available three-layer color film, of which "Ektachrome" or "-Kodacolor" Eastman Kodak Co.), "Anscochrome" (General Aniline and Film Co.), or "Agfacolor" (Agfa Aktiengesellschaft Leverkusen-Bayerwerk), are representative examples. Ektachrome has been found to be particularly suitable. A filter has been made from it, as is now described.

Ektachrome is constituted of three layers having, respectively, yellow dye (minus blue), magenta dye (minus green) and cyan dye (minus red). Following a scheme according to FIG. 2 using a Ronchi ruling, a piece of this film was exposed through a blue color filter as in FIG. 2A, then through a green color filter as in FIG. 2B, and then through a red color filter as in FIG. 2C. The piece of film thus exposed was developed, not as a reversal film as is ordinarily done, but by the Kodak Color Process C–22, available from Eastman Kodak Company, Rochester, New York, for their negative films "Kodacolor" and "Ektacolor". The use of Process C–22 to produce a negative from Ektachrome is known in the open literature. By this process, the yellow layer produces yellow grating lines in response to the blue light, the magenta layer produces magenta lines in response to the green light, and the cyan layer produces cyan lines in response to the red light. White lines were produced in each layer wherever the Ronchi ruling was black. This process produced exactly the multiplicative filter which is illustrated in FIG. 4A. A similar filter can be made using Anscochrome and developing by Kodak Color Process C–22. Kodacolor and Agfacolor films are also useful, but these have a bright yellow background which may be objectionable.

While the filter of FIG. 4A is illustrated as composed of Ronchi rulings, the gratings need not be limited to this configuration. Filters constructed of any periodic function, from simple harmonic to a square wave, can be used. The spatial frequency ($\omega_o$ in lines/*mm*) of each grating used in any embodiment of the invention should be chosen such that $$\omega_o \geqq 2\,\omega_s$$

where $2\omega_s$ is the image spatial bandwidth, in order to satisfy the sampling theorem. In a Ronchi ruling, each period is divided evenly between the opaque bar *b* and the transparent bar *a*, so that $a = p/2$.

Grating configurations may be used in which $a \neq p/2$, and in which, in place of square-wave functions which bars provide, other functions are used. Ronchi rulings were found convenient in FIG. 4A because of their relative simplicity and because they allow a high degree of light transmission while providing effective color-code modulation.

A "positive" color filter, that is, one contracted of positive colors, can also be made in a multi-layer color medium, along the same general lines as the "negative" filter of FIG. 4A, employing three superimposed gratings in the form of Relation 53, but with red, green and blue substituted for their respective negative colors, and with "black" or opaque spaces between the color lines. However, multiplication of such a "-positive" filter with a color scene will approximate an expression like Relation 52 only if the color line ("slit") widths (*a*) of each grating are very narrow compared to the period length *p* of the grating.

A suitable relationship is $$10a \leqq p.$$

Such a color filter will require resolution, in the black-and-white photostorage medium, or on the order of 5 $\omega_o$ to $10\omega_o$ depending in the spectral purity required, and the speed of the photostorage medium will be effectively reduced by the most severe filter factor (on the order of 10–15 for the blue zone). However, use of this "positive" filter would permit certain freedoms in photostorage, as will be explained below.

Figure 5:
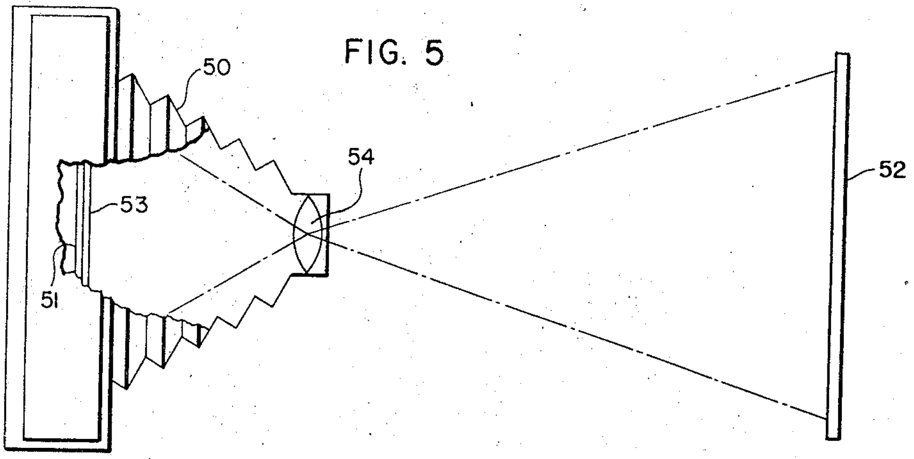
FIG. 5 illustrates the use of the filter of FIG. 4A in an ordinary camera.

The "negative" filter of FIG. 4A, or the corresponding "-positive" filter described above, can be multiplied with a scene and the individually modulated color products can be summed in a photostorage medium simply by placing the filter in a camera in contact with a piece of black and white panchromatic film, as is illustrated in FIG. 5. In this illustration a camera 50 is shown having a photographic plate 51 in the film plane of its lens 54, the scene being represented by an object 52. A suitable filter 53 ("negative" recording to FIG. 4A or "positive" as described above, for example) is shown in contact with the plate 51. The photographic plate has only one photostorage layer on it. The exposures through the three gratings of the filter are therefore simultaneously added in the photostorage on the plate 51. The resulting final black-and-white storage of color-coded information is thus the sum of products according to Relation 52 and has a configuration substantially as is schematically shown in FIG. 3. It may be a transparency. In this embodiment of the invention, however, the color-coded black-and-white image of the scene is obtained in a single step in an ordinary camera, and can therefore be used by even the unskilled amateur photographer.

The sum of images stored in a configuration according to FIG. 3, whether by serial addition according to FIG. 1, or by simultaneous addition, as illustrated for example in FIG. 5, can be separated by Fourier transform techniques with partially coherent polychromatic light. Bocca U.S. Pat. No. 2,050,417 suggests in its FIG. 6 a system for performing the separation, in which the stored black-and-white image is the projection positive located at position A-B-C-D. Bocca illustrates in his FIG. 4 an idealized representation of diffraction orders along the primary axes of diffraction due to the three gratings stored in the projection positive. In practice, however, I have found that, due mainly to nonlinearities in photographic processing of the black-and-white color-coded stored image, this idealized representation is not achieved, but instead cross-products appear along axes parallel with the primary axes. These cross products can cause degradation in the reproduction of the original color scene unless steps are taken to minimize their effects. Use of a narrow-line grating, as in the "positive" filter I have describe above, or with very wide opaque lines 15.1 in FIG. 1, will minimize the effects of such cross-products in the reproduction. If, for example, the width *a* of transparent lines is such that the relationship $10a \leqq p$ is observed, nonlinearities in the photographic processing of the color-coded black-and-white stored image can be ignored, for practical purposes, even though systems according to the invention require the storage of continuous tone, rather than mere binary images. This will, however, be done at the expense of the resolution requirements described above.

Degradation of the reconstructed image due to cross-products in the Fourier transform of the color!-coded blank-and white stored image can be reduced to insignificance by processing the black-and-white storage images so that the amplitude transmission in the stored image is linearly proportional to the input intensity (i.e; exposure) in recording the image. If this is done, the cross-products are eliminated and the separation of color zones in the transform plane is mathematically exact, and the storage film need only resolve the fundamental carrier frequency.

It has been found mathematically that the cross-products can be eliminated by making the amplitude transmission of the object transparency linearly proportional to the input intensity (exposure) by which the exposures were made. To obtain this result requires an analysis of the density-versus-log-exposure curve for photographic material. A conventional equation for the intensity transmission of a photographic transparency when exposures are restricted to the straight-line portion of the Dslog E curve is:

$$T_I(\underline{x}) = KI(\underline{x})^{-\gamma}$$

$$\text{where } K = 10^{-D_b}t^{-\gamma}.$$

The amplitude transmission for the transparency can be stated as:

$$T_A(x) = \sqrt{T_I(\underline{x})} = \sqrt{K}I(\underline{x})^{-\gamma/2}$$

In these equations:

$T_I(\underline{x})$ is the intensity transmission $K$ is a constant $I(\underline{x})$ is the intensity distribution of an image formed by uniformly illuminating a transparency $\gamma$ is the slope of the density-versus-log-exposure curve $D_b$ is the base density of the photographic material $t$ is time duration of exposure $T_A(\underline{x})$ is the amplitude transmission.

The equation for amplitude transmission can be made linear with input intensity transmission by setting gamma equal to −2. It must be recognized however that for this to have any valid effect the gamma should also be constant. For example, it becomes important that no image exposure be made in a nonlinear portion of the density-versus-log-exposure curve.

In processing the images for a constant gamma of −2, it is necessary to relate this gamma to the coherence of the optical system. Measured density-versus-log-exposure curves vary with the conditions of measurement. Thus curves measured with a densitometer, a microdensitometer, and in a coherent system may differ one from the others. These differences are apparently due to differences in diffuse and spectral density which in turn relate to the graininess of the photographic emulsion. For the present invention, the gamma should be determined by measurement in an optical system of the same degree of coherence as is used to reconstruct and display the colored images.

The following two examples illustrate specific methods that have been used in practicing the invention.

EXAMPLE I

Figure 6:
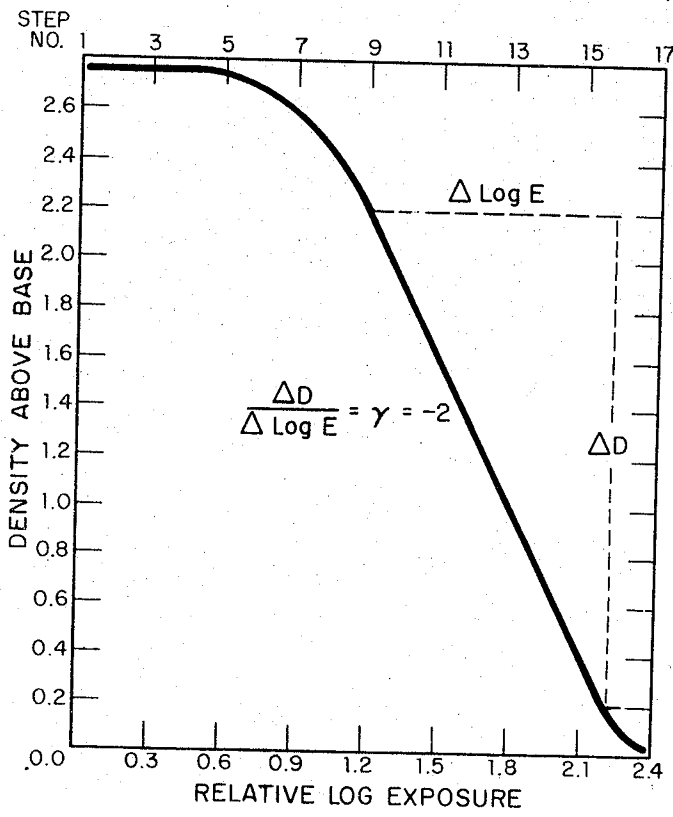
FIG. 6 is a graphical illustration of a density versus log exposure curve for reversal processing of photographic films useful in explaining a technique which may be employed in practicing the invention.

The photographic plate 51 used in the camera 50 had a reversal process density-versus-log-exposure curve with a gamma of −2 as illustrated in FIG. 6. The plate was uniformly preexposed so that the object exposures fell in the straight portion of the exposure curve. The maximum total exposure was limited so that this also did not go beyond the straight line portion of the curve. The plate was then reversal processed as a direct positive.

The original colored image was reconstructed and read out in the coherent system of FIG. 8. The displayed image was of true color and good quality with no noticeable ghosting of the cross-product images observable upon close scrutiny.

EXAMPLE II

Figure 7:
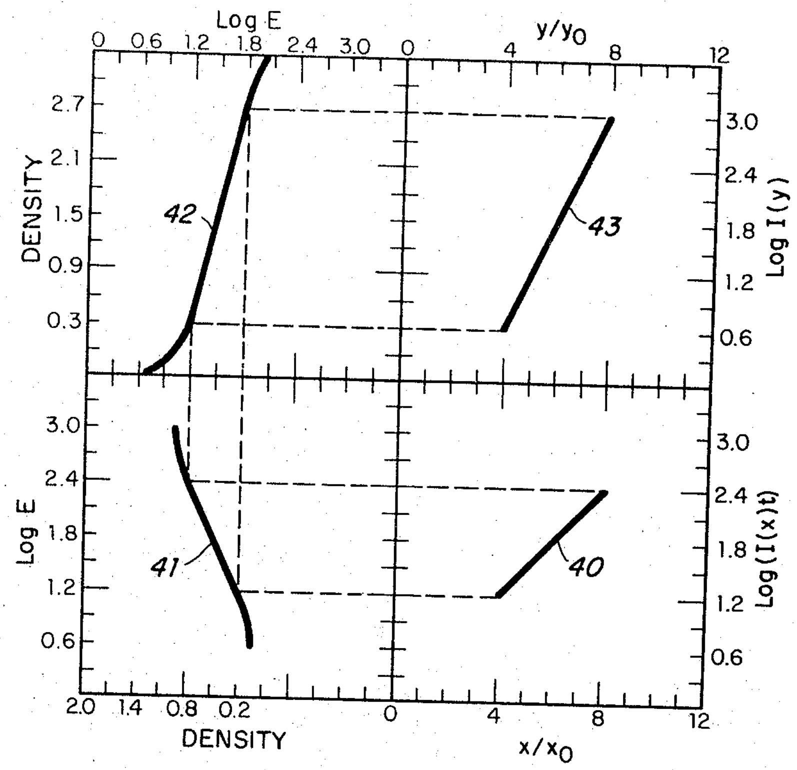
FIG. 7 is a graphical illustration of double negative processing to obtain the results of the reversal processing of FIG. 6.

Exposures were made the same as in Example 1 but using a film 51 processed to a gamma of minus one-half as shown by curve 41 in FIG. 7. Again the film was uniformly pre-exposed to eliminate the nonlinear toe of the exposure curve and the maximum exposure was also limited so as to remain in the straight line portion of the curve. This film was normally processed and then projection printed onto a high resolution plate having a normal process gamma of 4 as shown in curve 42 of FIG. 7. Again normal processing was used and the result was a transparency as shown in curve 43 having an intensity transmittance equal to the square of the input intensity as represented by curve 40. Thus the output amplitude transmittance is proportional to the input exposure. This transmittance parency was displayed in a coherent system according to FIG. 8 with results similar to those in Example I.

Figure 8A:
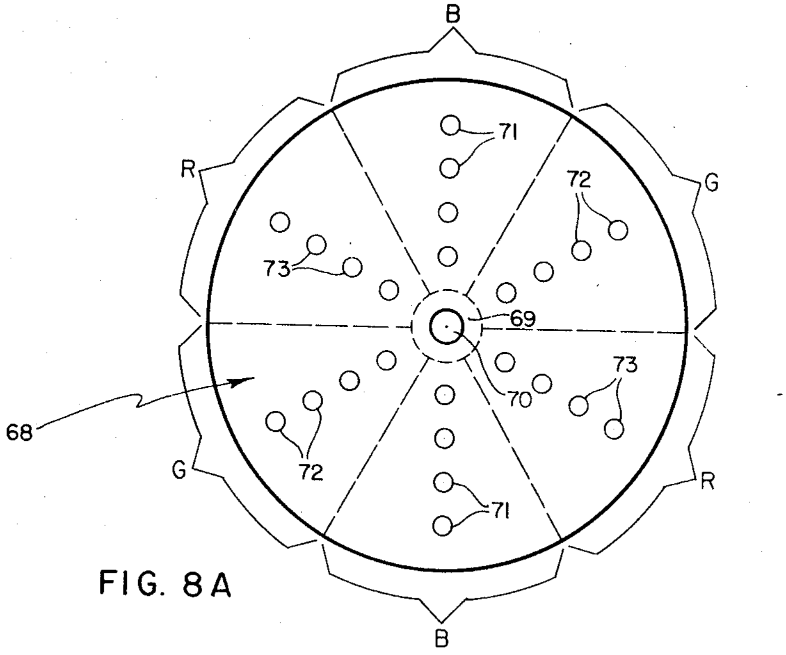
FIG. 8A is a detail sketch illustrating the use of a spatial and spectral filter in FIG. 8.

FIG. 8 illustrates diagrammatically an optical system for reconstructing and viewing or recording colored images that are stored in black-and-white as described above. FIG. 8 illustrates a fairly conventional partially coherent optical system comprising a light source 60, pin hole aperture 61, light collector lens 62, converging (or transform) lenses 63 and 65 separated by the sum of their focal lengths $f_1$ and $f_2$, frame means 66 for supporting the color-coded black-and-white transparency 29 and support means 67 for supporting a photosensitive color medium or a display screen. A color reconstruction filter 68, details of which are shown in FIG. 8A, is located in the back focal plane of the first transform lens 63 and the front focal plane of the second transform lens 65. For simplicity of illustration, only the grating modulation lines at three different angles are shown in the black-and-white stored image 29, but it will be understood that this image is a transparency containing original object information as well as grating information.

For purpose of the invention, light source 60 should be an intense polychromatic light source; an arc lamp will be suitable.

The pin hole aperture 61 is used to increase the coherency of the light and the collector lens 62 following the aperture can provide a light beam of a selected diameter for illuminating the system. With a collimated light beam the distance between the collector lens and the following components of the system becomes noncritical. With an uncollimated light beam magnification can be obtained.

The color reconstruction filter 68 in the back focal plane of the first lens 63 is located in the Fourier transform plane. The light beam from the collecting lens 62 is brought to a point focus at the transform plane. The light from the source 60 must be at least partially coherent at the illumination plane where the stored image 29 supported in frame 66 is illuminated. The required degree of coherence is related to the carrier frequency. Preferably the spatial coherence should be at least equal in extent to a few periods of the carrier frequency.

With the black-and-white color-coded stored image 29 positioned in frame 66, a diffraction pattern will appear in the transform plane. This diffraction pattern is depicted at the location of the color reconstruction filter 68. Light from the source 60 that is undisturbed by the recorded image 29 will be focused to the center of the transform plane as spot illustrated as the central illumination spot 70. This spot represents the zero order of each grating and is commonly called the DC spot. Since this spot is independent of grating orientation it will be common to all of the individual color-band images superimposed in the stored image 20. A first series of spots 71 (shown vertically oriented in FIG. 8) represents diffraction orders of the horizontal grating related, for example, to the blue exposure in FIG. 2A. Extending out in both directions beyond the zero diffraction order are the first and several higher diffraction orders.

The diffraction orders 72 related for example to the green exposure in FIG. 2B are in a line azimuthally rotated 60° clockwise from the diffraction orders 71, and the diffraction orders 73 related for example to the red exposure of FIG. 2C are in a line rotated azimuthally 60° clockwise from the diffraction orders 72.

FIG. 8 shows only diffraction orders along the primary axes of diffraction. If appropriate steps are taken, as described above, cross-products will not appear along axes parallel with the primary axes.

Figure 8B:
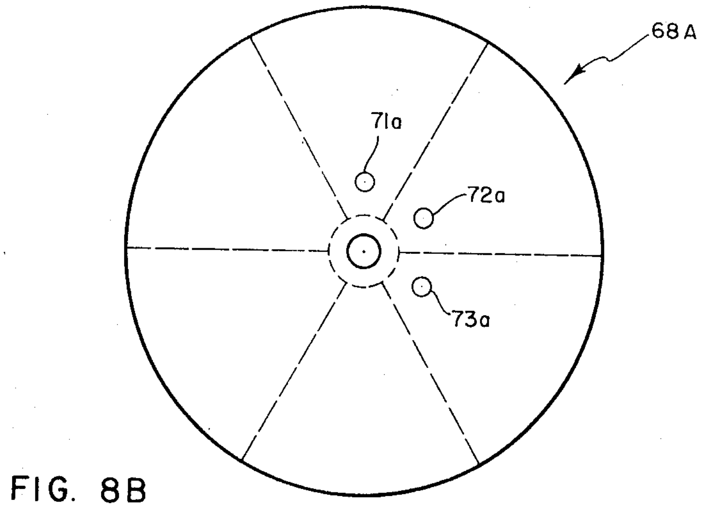
FIG. 8B is a detail sketch illustrating an alternative spectral and spatial filter.

Reconstruction of the original color scene is obtained by placing a color reconstruction filter 68 as illustrated, for example, in FIG. 8A in the transform plane of FIG. 8. The color reconstruction filter is, in this illustration, opaque at the center 69, to block the D.C. spot 70. Arrayed about the center in diametrically opposed pairs are six equal sectors of color filter material. A pair of blue filter sectors (B, B) are located in the path of light forming the diffraction orders 71 related to the blue exposure, a pair of green filter sectors are located in the path of light forming the diffraction orders 72 related to the green exposure, and a pair of red filter sectors are located in the path of light forming the diffraction orders 73 related to the red exposure (all referred, for example, to FIG. 2). A reconstruction, in full color, of the original scene 11, 12 appears in the plane of the support means 67, where it can be recorded on color-sensitive photographic film, or observed on a screen. This reconstruction would contain grating-like images (fringes) since more than one diffraction order is passed on each sector. By passing only one diffraction order through each sector or by destroying coherence between orders from each grating, continuous tone reconstructions may be obtained without the presence of fringes. FIG. 8B shows a spectral and spatial filter 68A which passes one order through aperture 71*a* in one sector (blue), one order through aperture 72*a* in a second sector (green), and one order through aperture 73*a* in the third section (red). The rest of this filter 68A is opaque.

Figure 9A:
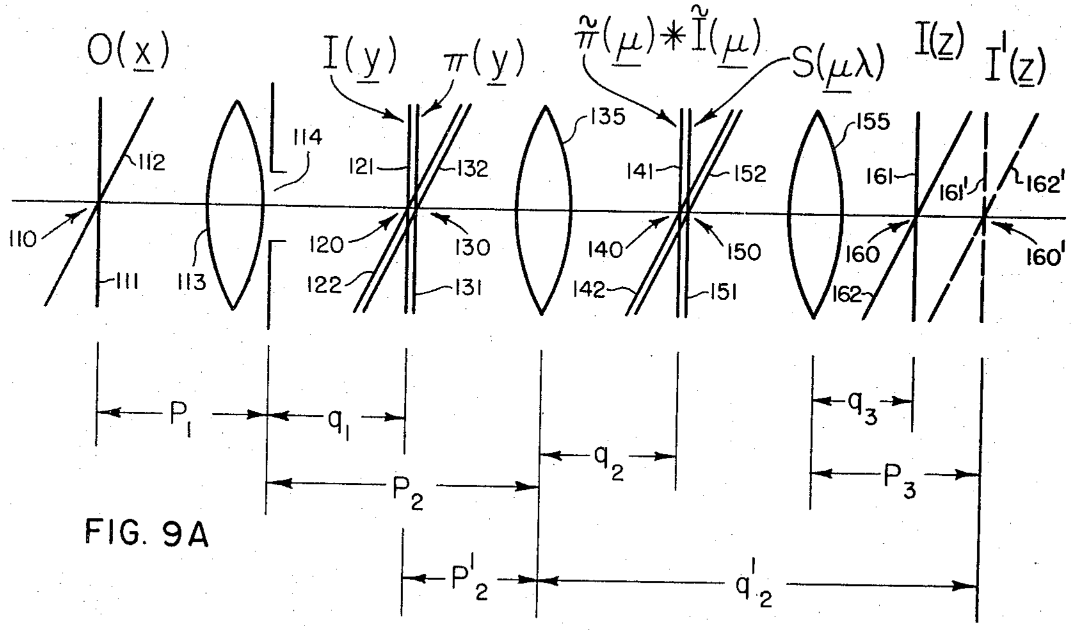
FIGS. 9A and 9B are schematic illustrations of two cameras, similar in principle, for making a multi-spectral zone image in color-blind storage material by Fourier transform techniques applied to an image of the scene followed by spatial and spectral filtering.

FIG. 9A shows a camera system for multiple-zone recording of spectral information in a color scene. In this figure, the plane of the object 110, corresponding to the object 10 in FIG. 2, is located by a pair of lines 111 and 112 crossing on the axis of the system. An ordinary achromatic camera lines 113, fitted with an adjustable-iris stop 114, focuses an image 120 of the object in an image plane, which is located by a pair of lines 121 and 122 crossing on the system axis. Consistent with notation familiar to workers in the art, the object may be termed $0(x)$, and the image may be termed $I(y)$, where $(x)$ represents the spatial coordinates in the object plane and $(y)$ represents the spatial coordinates in the image plane.

The components thus-far described are those found in a camera. The object plane-to-lens distance is $p_1$ and the lens-to-image plane distance is $q_1$, in accordance with the general relationship:

$$1/p + 1/q = 1/f; \text{ where}$$

"f" is the focal length of the lens involved. In place of the usual film and back, however, the system of FIG. 9A has a special neutral density grating 130 in the image plane. The plane of this grating is located in FIG. 9A by a pair of lines 131 and 132 crossing on the system axis. The special grating 130 has, for the purposes of describing this embodiment, three-gratings in a configuration as shown in FIG. 4A, in which each grating is a one-dimensional black-and-white cosine ruling of spatial frequency $\omega_o$, and has an amplitude transmission represented by:

$$P(y) = a + b\cos\omega_o y$$

where:

$P(y)$ represents the periodic modulation of the grating in one dimension in the image plane, and $a > b$. For the three zone system under description the amplitude transmission is:

$$\pi(y) = 3a + b\cos\omega_0 y|_{\alpha_1} + b\cos\omega_0 y|_{\alpha_2} + b\cos\omega_0 y|_{\alpha_3}$$

(Relation 57)

Relation 57 resembles Relation 53, except that no spectral functions are present in Relation 57.

Following the image plane and special grating 130 is a first transform (converging) lens 135 having focal length $f_2$, located with the image plane in front of it. Assuming the system is illuminated by partially coherent polychromatic light (sunlight for aerial applications; extended tungsten source for laboratory applications), a transform of the special grating 130 convolved with the image 120 will appear in the transform plane 140 in the back of the first transform lens 135. The transform plane may be designated the $(\mu)$ plane, and the image convolved with the grating may be designated $$\tilde{\pi}(\mu)*I(\tilde{\mu}).$$

Two lines 141 and 142 crossing on the system axis locate the transform plane.

The Fourier transform of the special grating 130, designated $$\tilde{\pi}(\mu),$$

is represented schematically in FIG. 10, in which the relative intensity distributions in the zero and first orders are shown, but no spectral distribution is indicated. The zero order is represented by a spot 145. The first orders of the grating at $\alpha_1$ are represented by spots 146; those of the grating at $\alpha_2$ by spots 147; and those of the gratings at $\alpha_3$ by spots 148. Since the gratings are all simple harmonic functions (cosine) the grating orders in the transform plane are delta functions, and no orders higher than the first order appear; the spots 146, 147 and 148 represent the delta function positions of $$\tilde{\pi}(\mu).$$

The term $\mu_o$ in FIG. 10 represents the separation of each first order position from the zero order.

The amplitude distribution of the camera lens exit pupil (i.e. the iris stop (114) distribution) is replicated by the special grating $$\pi(y)$$

so as to be convolved about each of the delta function positions in the transform plane 140. When the iris 114 is stopped down so that the diameter of the iris image is $\mu_o$ or less, these iris stop replication images become separated in the transform plane. This is shown more clearly, and in greater detail in FIGS. 11A and 11B.

Figures 11A, 11B, 11C:
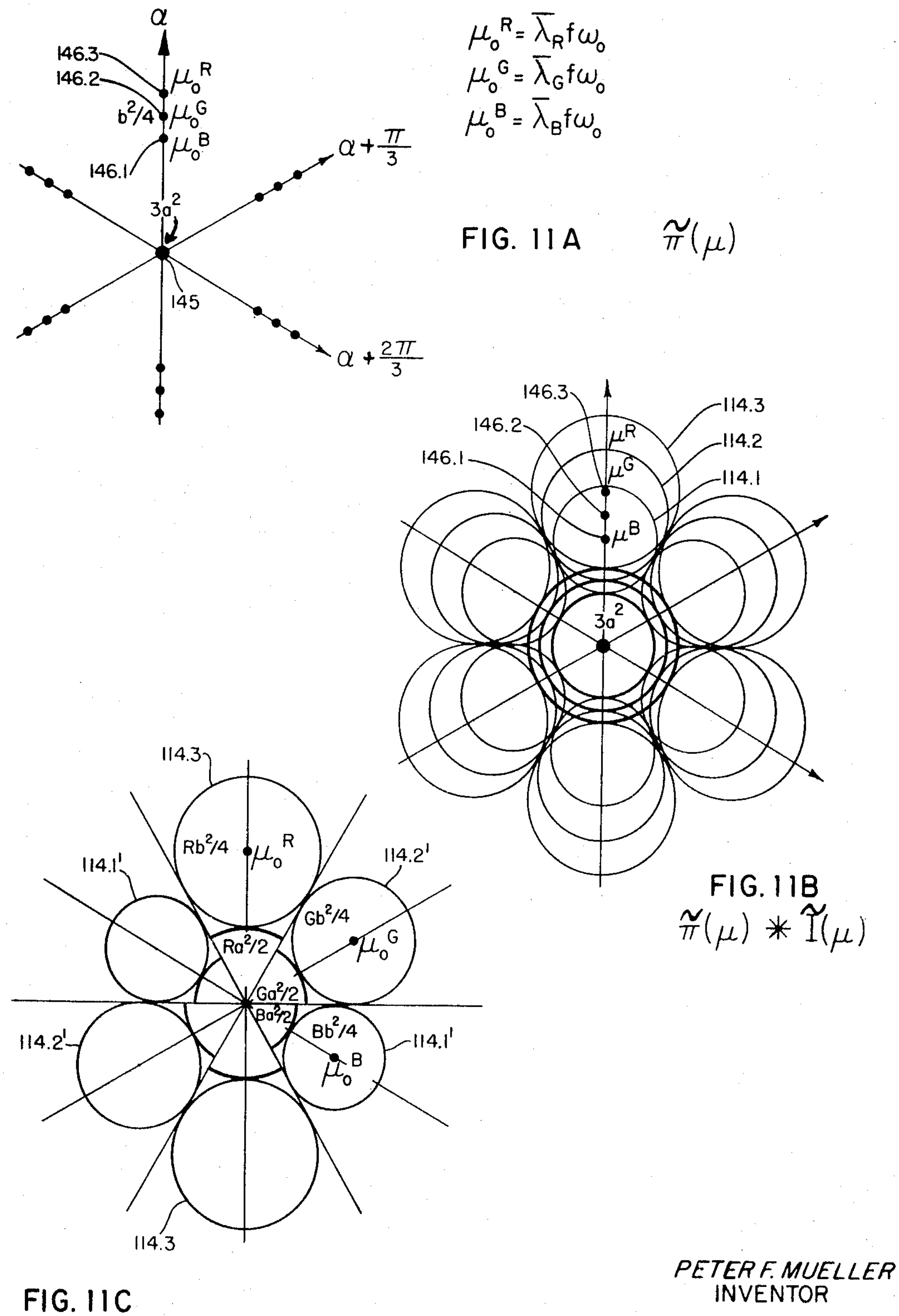
FIG. 11 is a set of detail sketches illustrating the process of color-coding used in the systems of FIGS. 9A and 9B.

In FIG. 11A the position of each first-order delta function spot in FIG. 10 is taken by a series of smaller dots representing the spectral distribution in the diffraction order. Thus, for example, three small dots 146.1, 146.2 and 146.3 are shown for the grating at $\alpha_1$, representing the centers, respectively, of the blue, green and red bands of the spectrum, spaced $\mu_o$ from the zero order spot 145. The intensity distribution $b^2/4$ for this entire first-order spot 146 is also shown. FIG. 11B shows the convolution of the exit pupil distribution about each delta function. Reference characters have been assigned to exit pupil images 114.1 about dot 146.1, 114.2 about dot 146.2, and 114.3 about dot 146.3, respectively. For the sake of simplicity, and because it is not necessary to do so, additional reference characters have not been assigned in FIGS. 11A and 11B. It is seen, however, that the Fourier transform of the image convolved with the grating contains the color information in the image, spatially dispersed.

Spectral band limiting of each of the three zones into which the image is separated by the grating 130 is achieved in the transform plane by introduction of a spectral filter 150, which is located in the transform plane. This filter may be similar in construction to the filter of FIG. 8A, except that it need not stop the zero order. The plane of this filter is located by two lines 151 and 152 crossing on the system axis. This filter is the first element in the system to introduce color information, and it is therefore designated as $S(\mu,\lambda)$, a function of both spatial coordinates in the transform plane and of wavelength. As is indicated in FIG. 11C, this filter is multiplied with the Fourier transform and passes red images from one grating, blue images from another grating, and green images from the third grating. The circles designated 114.3 represent the red images which are passed from the grating oriented at $\alpha_1$. The circles designated 114.2' represent the green images which are passed from the grating oriented at $\alpha_2$. The circles designated 114.1' represent the blue images which are passed from the grating oriented at $\alpha_3$. If the zero order is passed, portions of it will be shared by each color. While in this scheme the resolution is not identical for all colors, and it is realized that the iris stop 114 could be given a complex shape and spectral transmission to compensate for this, it is not necessary to do so.

A second transform lens 155, of focal length $f_3$, is located with the transform plane 140 in front of it, and a final image and/or film plane 160 in back of it. This latter plane is located by a pair of lines 161 and 162 crossing on the system axis.

The plane 160' located by dashed lines 161' and 162' crossing on the system axis is the plane where the image (I'($\underline{z}$)) would be if the second transform lens 155 were not present. This plane 160' is located a distance $q'_2$ from the first transform lens 135, while the image plane 120 is located a distance $p'_2$ in front of that lens. Plane 160' is located a distance $p_3$ in "front" of the second transform lens 155, while the final image plane 160 is located a distance $q_3$ in back of that lens. The iris stop 114 is located a distance $p_2$ in front of the first transform lens 135, and the transform plane 140 is located a distance $q_2$ in back of that lens. The image (I($\underline{z}$)) in the final image plane 160 may be described as:

$$I(\underline{z})=I_R(\underline{z})\cdot P'(z)\Big|_{\alpha_1}+I_G(\underline{z})\cdot P'(z)\Big|_{\alpha_2}+I_B(\underline{z})\cdot P'(z)\Big|_{\alpha_3}$$

(Relation 58)

where the $P'(z)$ components are modified forms of the cosine fringes $P(y)$), and the zonal components $I_R(\underline{z})$, $I_G(\underline{z})$ and $I_B(z)$ form the image $$I(\underline{y})=I_R(\underline{y})+I_G(\underline{y})+I_B(\underline{y})$$

(Relation 59)

As has already been described, color coded images in the form of Relation 58 can be stored in a color-blind photostorage medium, from which, by spatial filtering with polychromatic light and spectral filtering with a filter similar, for example, to filter 68 (see FIGS. 8 and 8A), the individual spectral zones can be recombined to form a full color image of the original object. Thus, by merely placing a suitable black-and-white photostorage medium (not shown) in the film plane 160, and suitably exposing it and developing it, a color-coded black-and-white stored image having the same properties as that represented in FIG. 3 is subsequently obtained in a camera system according to FIG. 9A.

The system of FIGS. 9–11 has several advantages, and unique properties. It will be observed, first, that the special grating 130 is a black-and-white grating contracted in a single layer of photographic material. Color coding is not introduced until after this grating has been convolved with the image. The color coding spectral filter 150 is physically easier to construct than a multi-color grating. Since delta functions appear in the transform plane, it is possible to use several gratings oriented closer together than $\pi/3$, so that the achievable number of zones is greater than three. The purity of spectral zone separation is not restricted to any particular color scheme and, indeed, it is envisioned that different narrow color zones within a small segment of the spectrum can be separately coded and viewed or recorded. Thus, if for research purposes one desires to investigate a narrow spectral zone, or even a line, within the blue or the red region for example, this narrow zone or line can be coded with any desired color and later viewed or recorded as represented by that coding color. This provides a useful application for the invention in the study of an aurora, for example.

In a practical example which has been constructed according to FIGS. 9A, 10 and 11, the spectral filter 150 was made for the conventional tri-color zones (red, green and blue) using Wratten filters No. 25, No. 58 and No. 47, respectively, with azimuthal characteristics $\alpha_1$, $\alpha_2$ and $\alpha_3$, respectively. Neutral density filters were also introduced along with the color filters, to balance the exposure, to equalize the effects of:

a. spectral output of the illuminating source;
b. spectral transmission of the colored absorption filters; and
c. spectral response of the recording emulsion.

In the case of a tungsten source with Panatomic-X film, these N.D. filters are:

Red—N.D. = 0.50 with No. 25 Wratten
Green—N.D. = 0.40 with No. 58 Wratten
Blue—N.D. = 0.00 with No. 47 Wratten The D.C. spot 145 can be blocked, but, if it is not, the spectral filter 150 is more efficient, reducing the required exposure time for making the stored image and reducing the film resolution requirements on the photostorage medium.

Figure 9B:
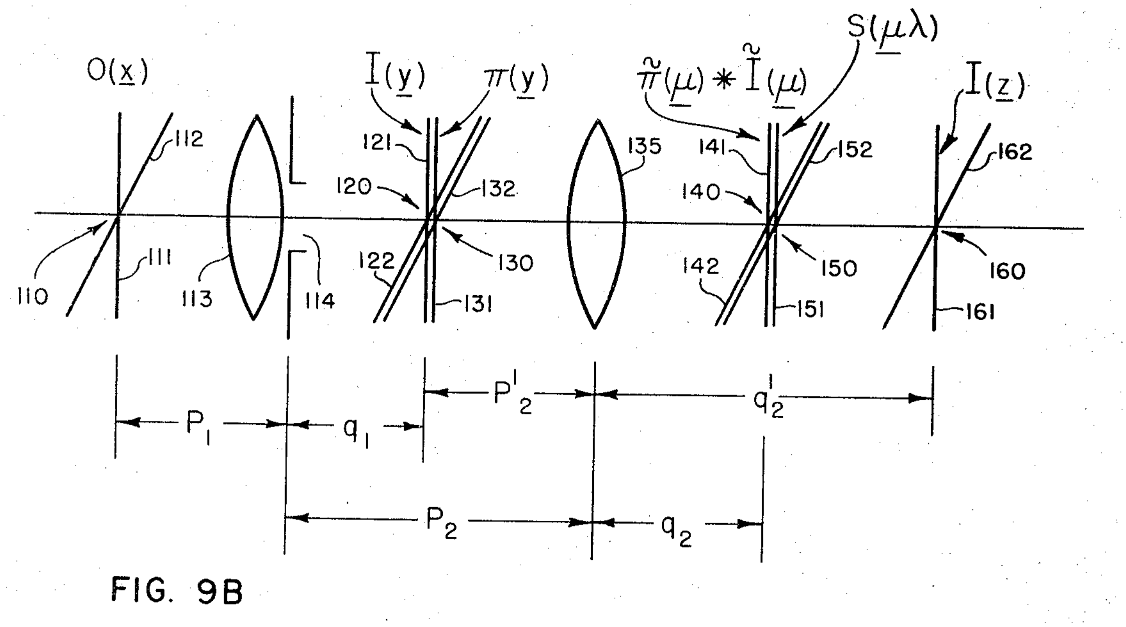

FIG. 9B shows another system which will accomplish the same purpose as the system of FIG. 9A. Similar parts of both figures have the same reference characters. FIG. 9B omits the second transform lens 155 of FIG. 9A, and the optical relationship $p'_2$ and $q'_2$ are altered. The optical distances $p_1$ and $q_1$, and $p_2$ and $q_2$, are similar in both figures.

If the "negative" color filter of FIG. 4A is substituted in FIG. 9B (for example) for the special filter 130, then the spectral filter 150 can be eliminated, and the lens 135 can be used as a relay lens to reimage the product of the image I ($\underline{y}$) and the filter $$\pi(\underline{y}, \lambda)$$

onto a photostorage material located in the $I(\underline{z})$ plane 160. This arrangement removes problems (if any) which may be associated with maintaining the grating in contact with the photostorage material. The specification of my parent application terminates here.

In the above embodiments involving the fabrication of a photostorage record, the record may have been represented as a distribution in terms of varying density or transmittance. The invention, however, is not limited to use with variable density or opacity records, but is equally applicable to records of other types including variable retardation (phase) records, such as might be produced by bleaching a silver density record or with thermoplastic recording media, and to combinations of phase and density records.

A brief mathematical analysis is here presented to illustrate the application of my Fourier optical synthesis concepts to phase functions.

Consider two pure phase images $$e^{i\phi_1(x)}$$

and $$e^{i\phi_2(x)}$$

interlaced so that the resulting transparency has amplitude transmittance $$T_A(x)=e^{i\phi_1(x)}P(x)+e^{i\phi_2(x)}[(1-P(x)], \qquad (60)$$

where P(x) is as above. The Fourier transform of this amplitude transmittance distribution is $$\tilde{T}_A(\mu)=\int (A_1(\mu-\xi)-A_2(\mu-\xi)+A_2(\mu))$$

$$1/2 \operatorname{sinc} \pi p/2\xi \sum_{n=-\infty}^{\infty} \delta(\xi-n/p)d\xi \qquad (61)$$

where $A_1(\mu)$ is the Fourier transform of $$e^{i\phi_1(x)},$$

$A_2(\mu)$ is the Fourier transform of $$e^{i\phi_2(x)},$$

and $\xi$ is a dummy variable of integration. Spatially filtering for the $n=\pm 1$ orders yields the spectral difference function $$\tilde{T}_A(\mu)|_{n=\pm1} = 1/\pi[A_1(\mu-1/p) - A_2(\mu-1/p)]. \quad (62)$$

Transforming back to image space gives $$T_A(u)|_{n=\pm1} = e^{2\pi iu/p}/\pi[e^{i\phi_1(u)} - e^{i\phi_2(u)}]. \quad (63)$$

Observing the intensity distribution we see $$T_I(u)|_{n=\pm1} = T_A(u)|_{n=\pm1}T^*_A(u)|_{n=\pm1}$$
$$= 1/\pi 2[2-2\cos(\phi_1(u)-\phi_2(u))] \quad (64)$$

If we define $\delta\phi(u) = (\phi_1(u) - \phi_2(u))$ as the desired phase difference function and expand equation 64, $$T_I(u)|_{n=\pm1} = 2/\pi 2[1-1+(\Delta\phi(u))^2/2-(\Delta\phi(u))^4/24+\ldots]$$

which reduces to $$T_I(u)|_{n=\pm1} = 1/\pi 2(\Delta\phi(u))^2$$

under small phase angle (low contrast) assumptions.

It is seen, then, that the above-described Fourier optical synthesis principles apply irrespective of whether the synthesized functions are variable phase or amplitude functions. It is of note that the utilization of phase rather than density records has certain advantages, among which is greater efficiency in utilizing the illuminating radiation.

Yet another application of the principles of this invention is to interlace a positive density image with its negative. To implement this concept a composite record may be formed on which a density image having transmittance $I_1(x,y)$ is interlaced with another density image the transmittance $I_2(x,y)$ of tra; (2) the $n=\pm1$, $m=\pm1$ orders vanish; and (3) the $m=I_2(x,y)$ becomes, with the aid of the binominal expansion theorem, $a - b\cos\theta$ plus higher order terms which may be neglected.

Employing the above-described Fourier optical synthesis techniques to subtract $I_2(x,y)$ from $I_1(x,y)$, at the first spectral order in a coherent optical detection system (see FIG. 1E above) there appears $$I_1(x,y) - I_2(x,y) = [a+b\cos\theta] - [a-b\cos\theta]$$
$$= 2b\cos\theta.$$

The D.C. spectra represents $$I_1(x,y) + I_2(x,y) = [a+b\cos\theta] + [a-b\cos\theta]$$
$$= 2a$$

Thus, we see that the spectra at the first side order represents an amplified record function with the background removed. In addition, since the signal spectrum does not appear in frequency space convolved about the zeroth order delta function position, the bandwidth of the retrieved first order spectra may be maximized without the usual problems of aliasing from with the zeroth order spectrum.

This application of the invention may be implemented as follows. Let the object function to be processed be color coded such that the signal and background appear in a different positive primary color or colors, or more broadly, in colors constituted in mutually exclusive spectral bands. For example, let the signal have a blue spectral constitution, and the back-ground be yellow. Then erect an image of the color-coded object and multiply the image with a strip spectral filter similar to the FIG. 1I filter, but having alternate blue-yellow filter elements. Alternatively, green or red filter elements may be substituted for the yellow elements. Broadly stated, the spectral requirements of the coding and filtering colors are that the coding colors have mutually exclusive spectral transmission bands and that the filter elements have corresponding mutually exclusive transmission bands.

From this step on, the method follows the above teachings, namely, record the multiplicative combination of filter and image on a panchromatic record medium, process and retrieve in a coherent retrieval system, as described.

The invention is not limited to the particular details of construction of the embodiments depicted, and it is contemplated that various other modifications and applications will occur to those skilled in the art. To illustrate further, although the above-described embodiments have been limited to the interlacing of but two record functions at a spatial phase displacement of one-half the fundamental carrier period, the principles upon which the invention is predicated are broad enough to comprehend the effective interlacing of more than two record functions, or the use of carrier functions of different harmonic constitution, or the embodiment of spatial phase displacements between carriers of other than one-half period. Selection among the available parameters is determined by the output function which is desired. A first record function impressed upon a cosine carrier function could be interlaced with a second record function modulating a square wave carrier, in which case the first spectral order would represent a difference function if the relative spatial phase of the carriers is displaced by one-half the (common) carrier fundamental period. The spatial phase displacement between the carriers governs whether a complex amplitude addition, subtraction or partial addition of the respective record spectrum will take place. Rather than reading out the record functions by transmission, a reflection read-out may be used. Therefore, because changes may be made in the above-described apparatus, methods and systems without departing from the true spirit and scope of the invention herein involved, and it is intended that the subject matter of the above depiction shall be interpreted as illustrative and not in a limiting sense.

I claim:

1. A method of optical information processing comprising:
locating in coherent illuminating radiation in optically overlapping relationship first and second record functions, respectively multiplied with first and second substantially periodic carrier functions, said first and second record functions characterizing different objects, said first and second carrier functions effectively having like azimuthal orientation and a like Fourier component;
forming in a common Fourier transform space first and second azimuthally coincident diffraction patterns of said first and second record functions, a diffracted spectral order of said first pattern spatially overlapping a diffracted spectral order of said second pattern in said common transform space;
adjusting the relative spatial phase of said first and second carrier functions to produce a complex amplitude addition of the radiation constituting said overlapped spectral orders; and
selectively transmitting at least a portion of said overlapped spectral orders through said Fourier transform space.

2. A method of optical information processing comprising:
locating in coherent illuminating radiation in optically overlapping relationship first and second record functions respectively multiplied with first and second substantially periodic carrier functions, said first and second record functions characterizing different objects, said first and second carrier functions effectively having like azimuthal orientation and a like Fourier component;
forming in a common Fourier transform space first and second azimuthally coincident diffraction patterns of said first and second record functions, a diffracted spectral order of said first pattern spatially overlapping a diffracted spectal order of said second pattern in said common transform space;
causing the spatial phase of said first and second carrier functions to be relatively displaced to produce a complex amplitude subtraction of the radiation constituting said overlapped spectral orders to form a spectral difference function;
selectively transmitting said spectral difference function through said Fourier transform space; and retransforming said spectral difference function to produce a complex amplitude distribution related to the point-by-point difference in luminance between said first and second record functions.

3. A method as defined by claim 2 wherein said carrier functions have the same fundamental period and wherein spatial phase displacement equals one-half of said fundamental period.

4. A method as defined by claim 3 wherein said first and second record functions are interlaced on a common recording medium.

5. A method of optical information processing, comprising:

locating in coherent illuminating radiation a composite mosaic record comprising four record functions respectively multiplied with four two-dimensional carrier functions of like fundamental periods but spatial phase displaced by substantially one-half of said fundamental periods in each of two period directions whereby each mosaic unit comprises four elements respectively constituting portions of said four record functions;

forming in a Fourier transform space a diffraction pattern of said composite record including first spectral orders containing different vectorial combinations of complex amplitude distributions respectively associated with said four record functions; and selectively transmitting through said transform space at least one of said first spectral orders.

6. The method of claim 5 wherein one of said four record functions represents the sum of the remaining three functions.

7. A method of making a composite optical record for processing by Fourier transformation and spatial filtering techniques, comprising:

interlacing first and second record functions respectively multiplied with first and second carrier functions having a like fundamental period with a spatial phase displacement of said first and second carrier functions of substantially one-half of said fundamental period of said carrier functions, said first and second record functions characterizing different objects.

8. The method defined by claim 7 wherein said composite record is formed by sequentially exposing a photosensitive material first through a grating mask to form said first record function and then through said grating mask phase displaced by one-half of said fundamental period to form said second record function.

9. The method defined by claim 7 including locating said first and second carrier modulating record functions in separate beams of illumination radiation, forming at a common image plane first and second images of said record functions, optically overlapping said record functions, effecting an azimuthal alignment of said carrier functions, causing the spatial phase of said carrier functions to be displaced by substantially one-half of said fundamental period such that said record function images are effectively interlaced at said common image plane, and recording said interlaced images.

10. A method of making a composite record for processing by Fourier transformation and spatial filtering techniques, comprising:

exposing a photosensitive medium to form four record functions respectively multiplied with four two-dimensional carrier functions of like fundamental periods but spatial phase displaced by substantially one-half of said fundamental periods in each of two periods directions to thereby form a mosaic record, each mosaic of which comprises four elements respectively constituting portions of four record functions.

11. The method as defined by claim 10 wherein said fourth record function represents the optical sum of said first, second, and third record functions.

12. A method of photostorage and optical retrieval of information comprising:

fabricating first and second record functions respectively multiplied with first and second substantially periodic carrier functions having a like Fourier component;

additively combining said record functions by effectively optically interlacing them in a coherent optical system;

forming in a common Fourier transform space first and second azimuthally coincident diffraction patterns of said first and second record functions, a diffracted spectral order of said first pattern spatially overlapping a diffracted spectral order of said second pattern in said common transform space;

adjusting the relative spatial phase of said first and second carrier functions to produce a predetermined complex amplitude addition of the radiation constituting said overlapped spectral orders;

selectively transmitting at least a portion of said overlapped spectral orders through said Fourier transform space; and retransforming the transmitted spectra.

13. A method of photostorage and optical retrieval of information comprising:

making a composite optical record by interlacing first and second record functions characterizing different objects respectively multiplied with first and second carrier functions having a like fundamental period and a spatial phase displacement of substantially one-half of said fundamental period;

locating said record in coherent illuminating radiation;

forming in a common Fourier transform space first and second azimuthally coincident diffraction patterns of said first and second record functions, a first spectral order of said first pattern spatially overlapping a first spectral order of said second pattern in said common transform space, said half-period spatial phase displacement of said first and second carrier functions producing a complex amplitude subtraction of the radiation constituting said overlapped spectral orders to form a spectral difference functions;

selectively transmitting said spectral difference function through said Fourier transform space; and retransforming said spectral difference function to produce a complex amplitude distribution related to the point-by-point difference in luminance between said first and second record functions.

14. A method of optical information processing comprising:

locating in separate but mutually coherent beams of illuminating radiation first and second record functions respectively multiplied with first and second substantially periodic carrier functions, said first and second carrier functions effectively having a like fundamental period and azimuthal orientation;

effecting optical union of said separate light beams;

forming in a common Fourier transform space first and second azimuthally coincident diffraction patterns of said first and second record functions, a diffracted spectral order of said first pattern spatially overlapping a diffracted spectral order of said second pattern in said common transform space;

causing the spatial phase of said first and second carrier functions to be relatively displaced to produce a complex amplitude subtraction of the radiation constituting said overlapped spectral orders to form a spectral difference function;

selectively transmitting said spectral difference function through said Fourier transform space; and retransforming said spectral difference function to produce a complex amplitude distribution related to the point-by-point difference in luminance between said first and second record functions.

15. A method of making a composite optical record for processing by Fourier transformation and spatial filtering techniques, comprising:

interlacing first and second record functions respectively multiplied with first and second carrier functions having a like fundamental period with a spatial phase displacement of said first and second carrier functions of substantially one-half of said fundamental period of said carrier functions, said first record function representing an optical negative of said second record function.

16. The method of claim 15 wherein said composite record is formed by erecting an image of an object having discrete areas is colors characterized by first and second substantially mutually exclusive spectral bands, multiplying said image with a filter comprising first and second interlaced filter strips having substantially mutually exclusive spectral transmittance bands, said first strip being transmissive to wavelengths in said first spectral band to the exclusion of wavelengths in said second spectral band and said second strip being transmissive to wavelengths in said second spectral band to the exclusion of wavelengths in said first spectral band, and including the step of recording said image multiplied with said filter.

* * * * *